United States Patent
Shimada et al.

(10) Patent No.: US 8,692,545 B2
(45) Date of Patent: Apr. 8, 2014

(54) MAGNETOSTRICTIVE STRESS SENSOR

(75) Inventors: Munekatsu Shimada, Hachioji (JP); Hiroshi Sakurai, Chigasaki (JP); Yoshio Kawashita, Kamakura (JP); Kiyohiro Uramoto, Yokohama (JP); Toshimitsu Matsuoka, Yokosuka (JP); Masao Aihara, Yokosuka (JP); Mitsuaki Fujita, Yokosuka (JP); Masaharu Ooshima, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1177 days.

(21) Appl. No.: 12/529,693

(22) PCT Filed: Feb. 27, 2008

(86) PCT No.: PCT/JP2008/053421
§ 371 (c)(1),
(2), (4) Date: Sep. 2, 2009

(87) PCT Pub. No.: WO2008/117618
PCT Pub. Date: Oct. 2, 2008

(65) Prior Publication Data
US 2010/0127698 A1    May 27, 2010

(30) Foreign Application Priority Data

Mar. 28, 2007 (JP) .................. 2007-085520
Mar. 28, 2007 (JP) .................. 2007-085524
Nov. 21, 2007 (JP) .................. 2007-301346

(51) Int. Cl.
*G01R 33/18* (2006.01)
*G01B 7/24* (2006.01)

(52) U.S. Cl.
USPC ..................... 324/209; 324/252

(58) Field of Classification Search
USPC .................................. 324/209, 252
See application file for complete search history.

(56) References Cited

U.S. PATENT DOCUMENTS 5,437,197 A    8/1995 Uras et al.
2006/0022831 A1    2/2006 Mori

FOREIGN PATENT DOCUMENTS

| JP | 2005-037264 A | 2/2005 |
| JP | 2006-038648 A | 2/2006 |
| JP | 2007-040956 A | 2/2007 |

OTHER PUBLICATIONS

I. J. Garshelis, "New Types of Magnetoelastic Transducers for Sensing Force Related Parameters," SAE Paper No. 910856, Sensors and Actuators, 1991, pp. 183-192.
Japanese Office Action dated May 29, 2012 for Japanese Patent Application 2007-301346.

*Primary Examiner* — Reena Aurora
(74) *Attorney, Agent, or Firm* — Foley & Lardner LLP

(57) ABSTRACT

A magnetostrictive stress sensor (11, 12, 13, 14, 15, 16) includes: a magnetic member {20, (107, 108, 109, 110, 111, 112)} having a magnetostriction; a permanent magnet (30, 35, 113) adjacent to the magnetic member; a magnetic sensor (40, 104A, 104B) for detecting a leak magnetic flux on a side opposite to the permanent magnet with respect to the magnetic member, wherein the leak magnetic flux changes according to a stress acting on the magnetic member and the magnetic sensor detects the change of the leak magnetic flux, to thereby detect the stress acting on the magnetic member, and a direction (21, 108A, 109A) of the stress acting on the magnetic member is substantially orthogonal to a magnetizing direction (31, 31, 113A) of the permanent magnet.

17 Claims, 19 Drawing Sheets

(A)

(B)

MAGNETOSTRICTIVE STRESS SENSOR

TECHNICAL FIELD

The present invention relates to a magnetostrictive stress sensor for sensing stress by utilizing a reverse effect of magnetostriction.

BACKGROUND ART

For sensing stress applied to a member having elasticity, a method for adhering a strain gauge is commonly well known. For monitoring a stress (tensile stress and compressive stress) applied to around-foot members of an automobile and the like, however, robust property is required. Therefore, the method for using the strain gauge has a problem.

A non-patent document Garshelis, Ivan J., "New types of Magnetoelastic Transducers for Sensing Force Related Parameters," "SAE Paper," No. 910856, "Sensors and Actuator," 1991 proposes a stress sensor utilizing a reverse effect of magnetostriction (magnetostrictive stress sensor).

DISCLOSURE OF INVENTION

However, the conventional magnetostrictive stress sensor is not sufficient for practical implementation by detecting the stress accurately and precisely.

It is an object of the present invention to provide a magnetostrictive stress sensor capable of detecting stress accurately and precisely.

After studying hard for solving the above problem, the present inventors have found out that making stress direction and permanent magnet's magnetizing direction into a certain relation can accomplish precise and accurate detection of stress, thus leading to completion of the present invention.

The present invention is based on the above knowledge. A magnetostrictive stress sensor of the present invention comprises: a magnetic member having a magnetostriction; a permanent magnet adjacent to the magnetic member; a magnetic sensor for detecting a leak magnetic flux on a side opposite to the permanent magnet with respect to the magnetic member, wherein the leak magnetic flux changes according to a stress acting on the magnetic member and the magnetic sensor detects the change of the leak magnetic flux, to thereby detect the stress acting on the magnetic member, and a direction of the stress acting on the magnetic member is substantially orthogonal to a magnetizing direction of the permanent magnet.

BRIEF DESCRIPTION OF DRAWINGS

FIG. 11(A) explains a schematic structure of an experimental apparatus.

FIG. 11(B) shows a test piece as a magnetic member and a permanent magnet which is disposed on a surface side of the test piece.

FIG. 11(C) explains a position for measuring the magnetic flux density on a backface of the test piece.

FIG. 12(A) explains a schematic structure of an experimental apparatus.

FIG. 12(B) shows a test piece as a magnetic member and a permanent magnet which is disposed on a surface side of the test piece.

FIG. 12(C) explains a position for measuring the magnetic flux density on a backface of the test piece.

BEST MODE FOR CARRYING OUT THE INVENTION

Hereinafter, embodiments of the present invention are to be set forth referring to drawings.

Figure 1:
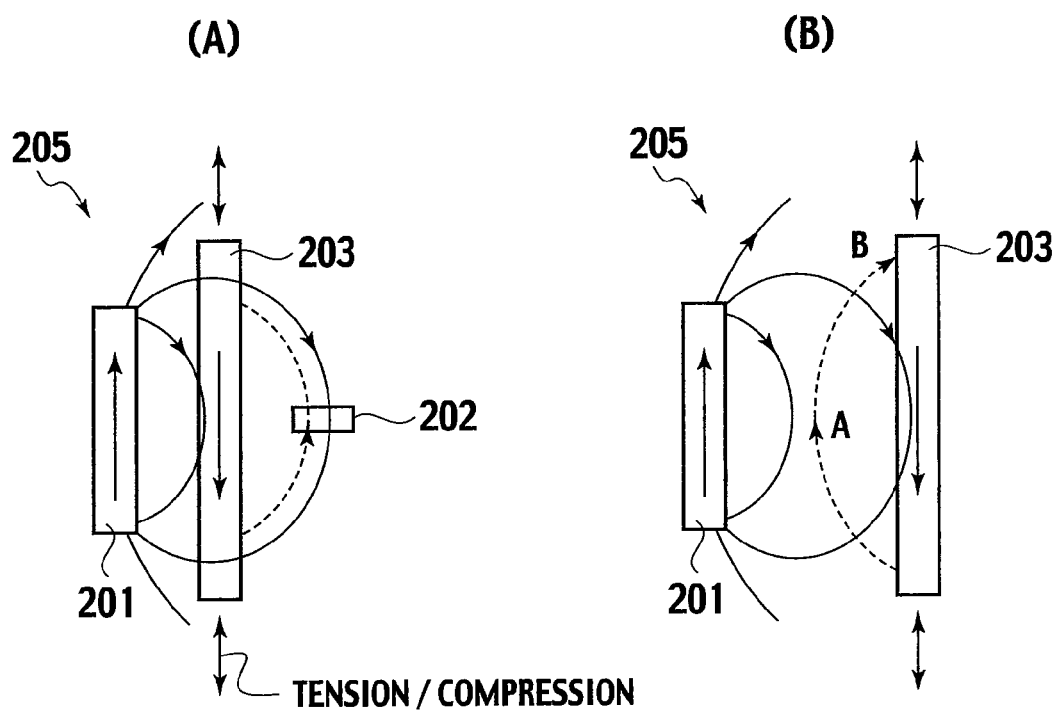
FIG. 1(A) and FIG. 1(B) explain structure and principle of a conventional magnetostrictive stress sensor.

At first, referring to FIG. 1, a structure and a principle of a magnetostrictive stress sensor 205 proposed in the above non-patent document 1 are to be set forth.

In FIG. 1(A), 201 denotes a permanent magnet and 202 denotes a magnetic sensor, while a core 203 (magnetic member) in the center has magnetostriction. Magnetic flux of the permanent magnet 201 is distributed as shown in FIG. 1(A), thus magnetizing the core 203 as indicated by an arrow. The magnetic flux of the permanent magnet 201 also passes through the core 203.

With a tensile stress acting on the core 203, the magnetic flux through the magnetic sensor 202 is decreased so that more of the magnetic flux of the permanent magnet 201 can pass through the core 203. Meanwhile, with a compressive stress acting on the core 203, the magnetic flux passing through the magnetic sensor 202 is increased since the magnetic flux is less likely to pass through the core 203. In this way, the scale of the signal from the magnetic sensor 202 is caused to reflect the scale of the stress acting on the core 203.

The above sums up the principle of the magnetostrictive stress sensor 205 proposed. The magnetostrictive stress sensor 205 has a feature that a power source is not necessary for causing the magnetic flux. The magnetic sensor 202 may also be placed in either a position A or a position B, as shown in FIG. 1(B).

Comparing the tensile stress and compressive stress, the compressive stress causes more change to the signal of the magnetic sensor 202. Data shows that, within a rated range of the magnetic sensor 202, the signal of the magnetic sensor 202 changes by 30% to 80% in the case of compressive stress.

In the above proposal, however, for taking the data, a columnar alnico magnet is disposed in the pipe-shaped core 203 and a linear Hall IC is put on a surface of the pipe. Notwithstanding, the thus taken data does not go beyond a step of checking the principle. For making the magnetostrictive stress sensor 205 more practical by accurately and precisely sensing stress, it is important to solve various problems associated with mounting, such as the direction of the stress acting on the core 203 relative to the magnetizing direction of the permanent magnet 201.

For practical use by sensing the stress accurately and precisely, the magnetostrictive stress sensor of the present invention has the following structure.

First Embodiment

Figure 2:
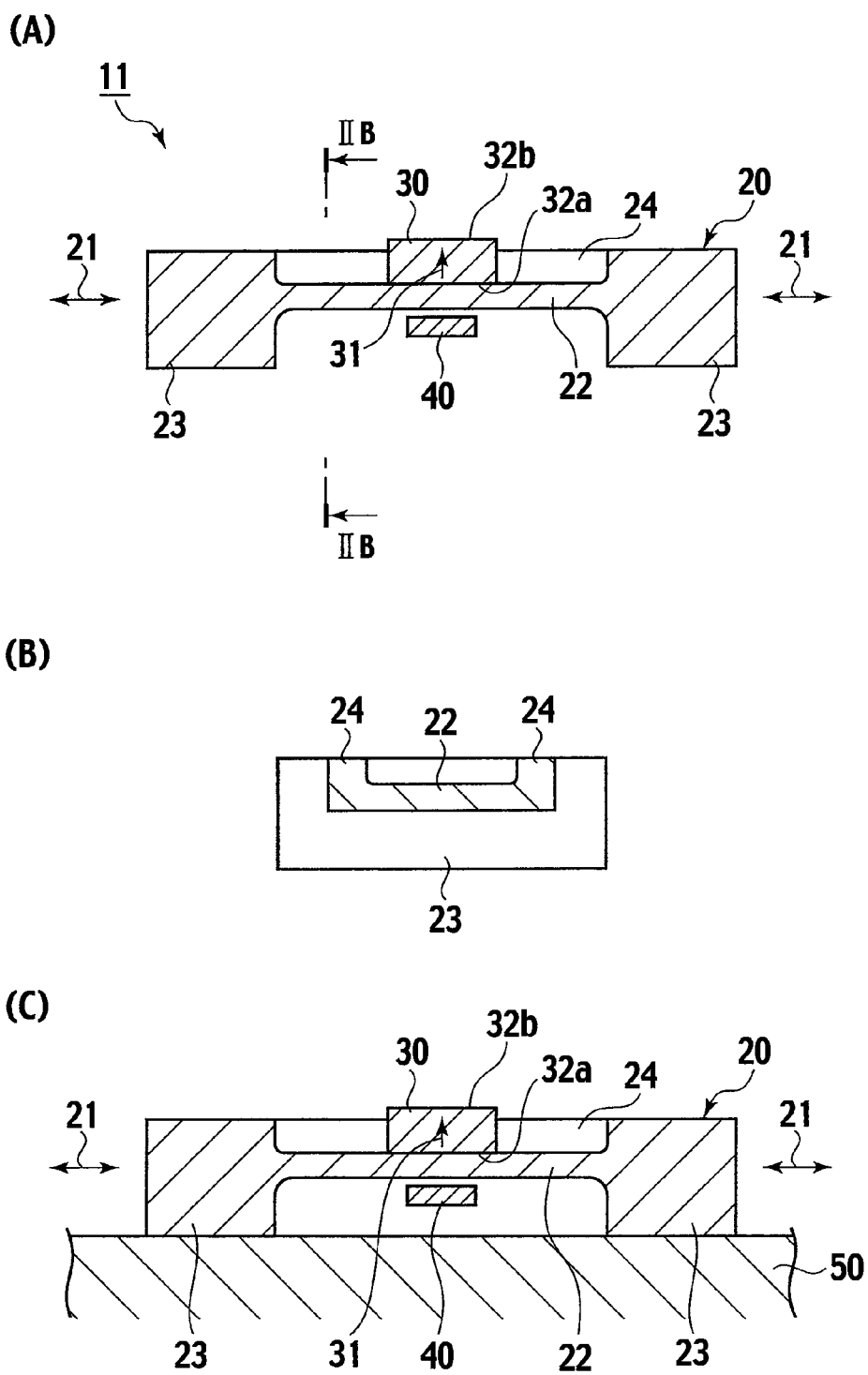
FIG. 2(A) is a cross sectional view showing a basic structure of a magnetostrictive stress sensor according to a first embodiment of the present invention.
FIG. 2(B) is a cross sectional view taken along the line IIB-IIB of FIG. 2(A).
FIG. 2(C) is a cross sectional view showing that the magnetostrictive stress sensor in FIG. (A) is mounted to a part on which a stress acts.

FIG. 2(A) is a cross sectional view showing a basic structure of a magnetostrictive stress sensor 11 according to a first embodiment of the present invention. FIG. 2(B) is a cross sectional view taken along the line IIB-IIB in FIG. 2(A). FIG. 2(C) is a cross sectional view showing that the magnetostrictive stress sensor 11 in FIG. 2(A) is mounted to a stress-applied member 50 on which the stress acts.

Referring to FIG. 2(A), the magnetostrictive stress sensor 11 includes a magnetic member 20 having magnetostriction, a permanent magnet 30 disposed close to the magnetic member 20, and a first magnetic sensor 40 for detecting leak magnetic flux on a side opposite to the permanent magnet 30 with respect to the magnetic member 20. The leak magnetic flux changes depending on the stress acting on the magnetic member 20. However, the first magnetic sensor 40 detects the change of the leak magnetic flux, to thereby detect the stress acting on the magnetic member 20. With the magnetostrictive stress sensor 11 according to the first embodiment, the direction (refer to arrow 21) of the stress acting on the magnetic member 20 and the magnetizing direction (refer to arrow 31) of the permanent magnet 30 cross substantially orthogonally.

The magnetic member 20 includes a plate-like strain-causing part 22 and a pair of leg parts 23 disposed at both ends of the strain-causing part 22. The permanent magnet 30's first end face 32a and second end face 32b each cross the magnetizing direction (refer to arrow 31). The first end face 32a faces the strain-causing part 22. The permanent magnet 30 is disposed in a state of contacting the strain-causing part 22.

Referring to FIG. 2(B), the magnetic member 20 has a flange part 24. In a cross section crossing relative to the stress direction (refer to arrow 21), end parts of the flange part 24 are each thicker than a center part of the flange part 24.

Referring to FIG. 2(C), via the leg part 23 of the magnetic member 20, the magnetostrictive stress sensor 11 is mounted to the stress-applied member 50 on which the stress acts. As the stress-applied member 50, for example, around-foot members of an automobile are raised. Joining the leg part 23 to the stress-applied member 50 can detect the stress acting on the stress-applied member 50. Since the strain-causing part 22 is joined to the stress-applied member 50 by way of a pair of the leg parts 23, a mean stress can be loaded to the strain-causing part 22 even when deformation of the stress-applied member 50 is not uniform. For joining the leg part 23 with the stress-applied member 50, known joining methods such as welding by electron beam or brazing are properly adopted.

With the magnetostrictive stress sensor 11, the direction (arrow 21) of the stress acting on the magnetic member 20 and the magnetizing direction of the permanent magnet 30 cross substantially orthogonally. Meanwhile, with the magnetostrictive stress sensor 205 conventionally proposed as shown in FIG. 1(A) and FIG. 1(B), the direction of the stress acting on the magnetic member (core 203) and the magnetizing direction of the permanent magnet 201 cross substantially in parallel. In this respect, the magnetostrictive stress sensor 11 of the first embodiment is different from the conventional magnetostrictive stress sensor 205. After studying hard, the present inventors have found out that the direction (arrow 21) of the stress acting on the magnetic member 20 and the magnetizing direction of the permanent magnet 30 crossing substantially orthogonally can bring about stabilized and good characteristics.

Namely, the magnetizing of the plate-shaped magnetic member 20 is restrained by the magnetic field of the permanent magnet 30. With a compressive force applied to the magnetic member 20, however, it is considered that the leak magnetic flux is increased since a reverse effect of the magnetostriction increases the magnetization in the direction orthogonal to the plate face (This is in the case of positive magnetostriction. Meanwhile, in the case of negative magnetostriction, the magnetization in the direction orthogonal to the plate face will decrease.). Contrary to this, with a tensile force applied to the magnetic member 20, it is interpreted that the leak magnetic flux is decreased since the magnetization in the direction parallel to the plate face increases.

The direction (refer to arrow 21) of the stress acting on the magnetic member 20 and the magnetizing direction (refer to arrow 31) of the permanent magnet 30 are substantially orthogonal, detecting the leak magnetic flux's change which depends on the stress, where the leak magnetic flux is on the side opposite to the permanent magnet 30 with respect to the magnetic member 20. The level of the leak magnetic flux is lower than the level of the magnetic flux caused by the permanent magnet 30. In this state, the first magnetic sensor 40 detects the change which depends on the stress, thus making it possible to accurately and precisely detect the stress acting on the magnetic member 20.

Moreover, the magnetic member 20 shaped into a plate can increase an actual stress, thus making it possible to sensitively detect the stress acting on the magnetic member 20.

Moreover, in the magnetic member 20's cross section orthogonal to the stress direction (refer to arrow 21), thicknesses at both ends are thick, thereby preventing the plate from being buckled even when the compressive force is applied. With this, the plate can be made thin, thus increasing stress level of compression. As such, not only the tensile force but also the compressive force can be detected sensitively, bringing about a sensor which is high in sensitivity to compressive force also.

The magnetic member 20 is preferably made from maraging steel. The maraging steel is high in strength and thereby stress level can be set high, thus bringing about a sufficient sensing sensitivity. Moreover, use of the maraging steel can bring about the magnetostrictive stress sensor 11 having a good sensing characteristic free of hysteresis. In this way, use of the maraging steel is preferable in terms of robustness, sensitivity and sensing characteristics of the magnetostrictive stress sensor 11.

It is more preferable that the magnetic member 20 is made from 18% Ni-base maraging steel (18% Ni-9% Co-5% Mo—Fe). This is due to a great magnetostriction of the 18% Ni-base maraging steel.

Moreover, it is preferable that the magnetic member 20 is made from 18% Ni-base maraging steel and is subjected to an aging treatment. This is because use of the maraging after the aging treatment brings about a good sensing characteristic free of hysteresis.

Samarium cobalt (SmCo) magnet is preferable as the permanent magnet 30, but not specifically limited thereto. In terms of electric power saving, miniaturizing and cost reduction, the permanent magnet 30 is preferable which does not need a power source and wirings for causing magnetic flux.

As the first magnetic sensor 40 for detecting the leak magnetic flux, a linear Hall IC can be used. This is for electric power saving and miniaturizing, and also for bringing about the magnetostrictive stress sensor 11 featuring a good sensing characteristic.

Moreover, in this specification, "stress direction substantially orthogonal to the magnetizing direction" is a concept used for the present invention compared with the magnetostrictive stress sensor 205 according to the prior art in FIG. 1. It is interpreted that, not only that the stress direction is precisely orthogonal to the magnetizing direction, the above concept includes a slight inclination within a range capable of detecting the stress accurately and precisely when the present invention is compared with the magnetostrictive stress sensor 205 in FIG. 1.

Referring to FIG. 11 to FIG. 18, set forth hereinafter is how the direction (arrow 221) of the stress acting on a magnetic member 220 relative to the magnetizing direction (arrow 231) of a permanent magnet 230 affects the sensing of stress.

Figure 14:
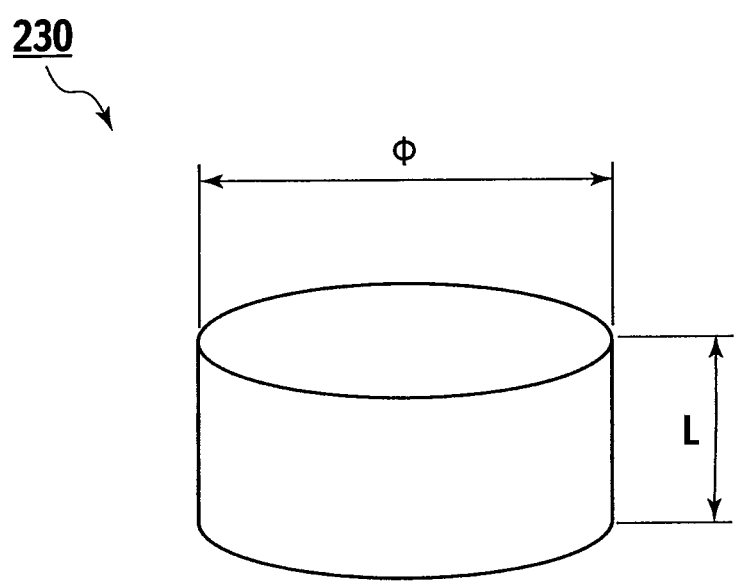
FIG. 14 is a perspective view showing the permanent magnet.

FIG. 11(A) to FIG. 11(C) and FIG. 12(A) to FIG. 12(C) explain experiments for checking how the direction (arrow 221) of the stress acting on the magnetic member 220 relative to the magnetizing direction (arrow 231) of the permanent magnet 230 affects the detection of stress. FIG. 11(A) to FIG. 11(C) show that the permanent magnet 230 is so disposed that the direction of the stress acting on the magnetic member 220 is substantially orthogonal to the magnetizing direction of the permanent magnet 230. Meanwhile, FIG. 12(A) to FIG. 12(C) show that the permanent magnet 230 is so disposed that the direction of the stress acting on the magnetic member 220 is substantially parallel to the magnetizing direction of the permanent magnet 230. FIG. 11(A) and FIG. 12(A) each explain a schematic structure of an experimental apparatus. FIG. 11(B) and FIG. 12(B) each show that a test piece 220 as the magnetic member 220 and the permanent magnet 230 which is disposed on a surface side of the test piece 220. FIG. 11(C) and FIG. 12(C) each explain a position for measuring the magnetic flux density on the backface of the test piece 220. FIG. 13(A) and FIG. 13(B) are respectively a perspective view and a front view each showing the test piece 220 as the magnetic member 220. FIG. 14 is a perspective view showing the permanent magnet 230.

Referring to FIG. 11(A) to FIG. 11(C) and FIG. 12(A) to FIG. 12(C), the permanent magnet 230 is mounted to the surface of the test piece 220 as the magnetic member 220 and a probe 240 of a gauss meter for measuring magnetic flux density is disposed on the backface of the test piece 220. A tensile stress was applied to the test piece 220 and the probe 240 was caused to slide in such a manner as to contact the backface of the test piece 220, to thereby measure the magnetic flux density. The above measurement was likewise implemented by applying a compressive stress to the test piece 220. FIG. 11(A) to FIG. 11(C) show that the permanent magnet 230 is mounted to the surface of the test piece 220 such that the magnetizing direction (arrow 231) of the permanent magnet 230 is substantially orthogonal to the direction (arrow 221) of the stress acting on the test piece 220. FIG. 12(A) to FIG. 12(C) show that the permanent magnet 230 is mounted to the surface of the test piece 220 such that the magnetizing direction (arrow 231) of the permanent magnet 230 is substantially parallel to the direction (arrow 221) of the stress acting on the test piece 220. For convenience' sake, disposition of the permanent magnet 230 in FIG. 11(A) to FIG. 11(C) is also referred to as "lateral disposition" while that in FIG. 12(A) to FIG. 12(C) is also referred to as "longitudinal disposition."

Referring to FIG. 13(A) and FIG. 13(B), the test piece 220 was prepared by using a maraging steel (made by Hitachi Metals, Ltd., trade name YAG300, 18% Ni-9% Co-5%

Mo—Fe). The test piece 220 has a thickness t=2 mm, a width W of parallel part=14 mm, a length P of parallel part=31 mm, a shoulder part radius R=3 mm and a grip part width b=20 mm. After preparing the test piece 220 through a machining, the test piece 220 was subjected to solute and aging heat treatments. The solute treatment was implemented in a vacuum at 820° C. for 2 hrs., followed by putting the test piece 220 into a furnace to be cooled to a room temperature. Then, for the aging heat treatment, the test piece 220 was kept in a vacuum at 490° C. for 5 hrs., followed by putting the test piece 220 into the furnace to be cooled to the room temperature.

Referring to FIG. 14, as the permanent magnet 230, a columnar magnet was used in such a manner as to be magnetized axially. An SmCo magnet having a diameter φ=10 mm and a length L=7 mm was used. The magnetic flux density at an end face of the permanent magnet 230 after the magnetizing was about 4 kG.

Gauss/Tesla—Meter (Model—5080) made by F. W. BELL was used as the gauss meter. A thin transverse probe (model STB58-0201) for Model—5080 made by F. W. BELL was used as the probe 240.

Referring to FIG. 11(A) and FIG. 11(C) and FIG. 12(A) and FIG. 12(C), the probe 240 contacting the backface of the test piece 220 was caused to slide as indicated by the arrow 241, thereby measuring the magnetic flux density in the direction perpendicular to the plate face of the test piece 220. The position for measuring the magnetic flux density on the backface of the piece 229 was the center in the widthwise direction of the parallel part. From a start point P1 which is 20 mm away upward in FIG. 11(C) from a central point P0 of the parallel part via the center in the widthwise direction of the parallel part to an end point P2 which is 20 mm away downward in FIG. 11(C) from the central point P0 of the parallel part, a measurement unit was set to 0.02 mm.

The load applied to the test piece 220 was 700 kgf for each of the tensile load and compressive load. The test piece 220's cross section in the widthwise direction of the parallel part is 28.0 mm². Each of tensile stress and compressive stress is 245 MPa.

With the permanent magnet 230 disposed laterally as shown in FIG. 11(A) to FIG. 11(C), the magnetic flux density was measured in such occasions as the load not applied, the tensile load applied and the compressive load applied. Likewise, as shown in FIG. 12(A) to FIG. 12(C), with the permanent magnet 230 disposed longitudinally, the magnetic flux density was measured in such occasions as the load not applied, the tensile load applied and the compressive load applied. Measurement results are shown in FIG. 15 to FIG. 18.

Figure 15:
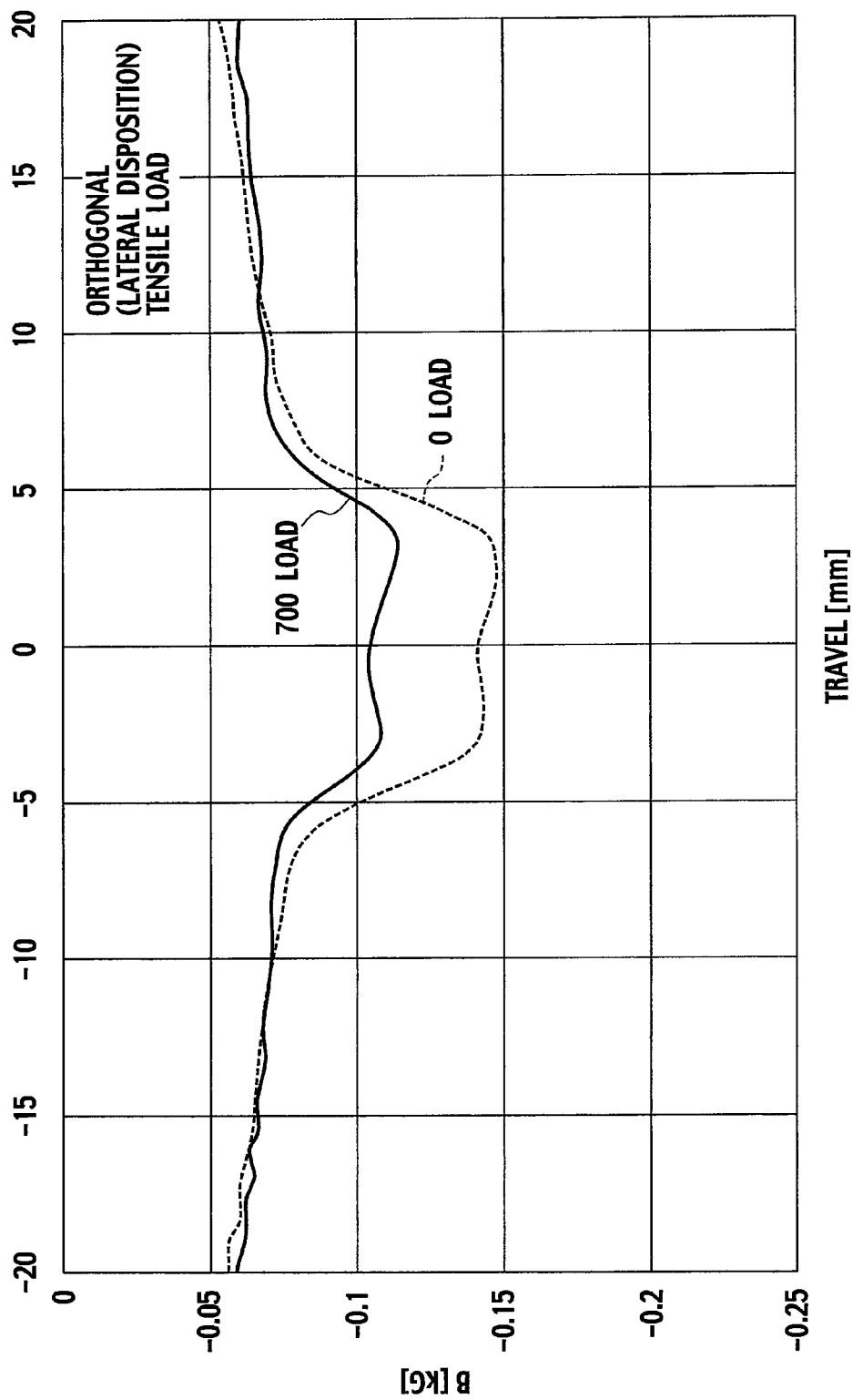
FIG. 15 is a graph showing measurement results of the magnetic flux density with a tensile load applied in a state that the permanent magnet is so disposed that the direction of the stress acting on the test piece is substantially orthogonal to the magnetizing direction of the permanent magnet (lateral disposition).
Figure 16:
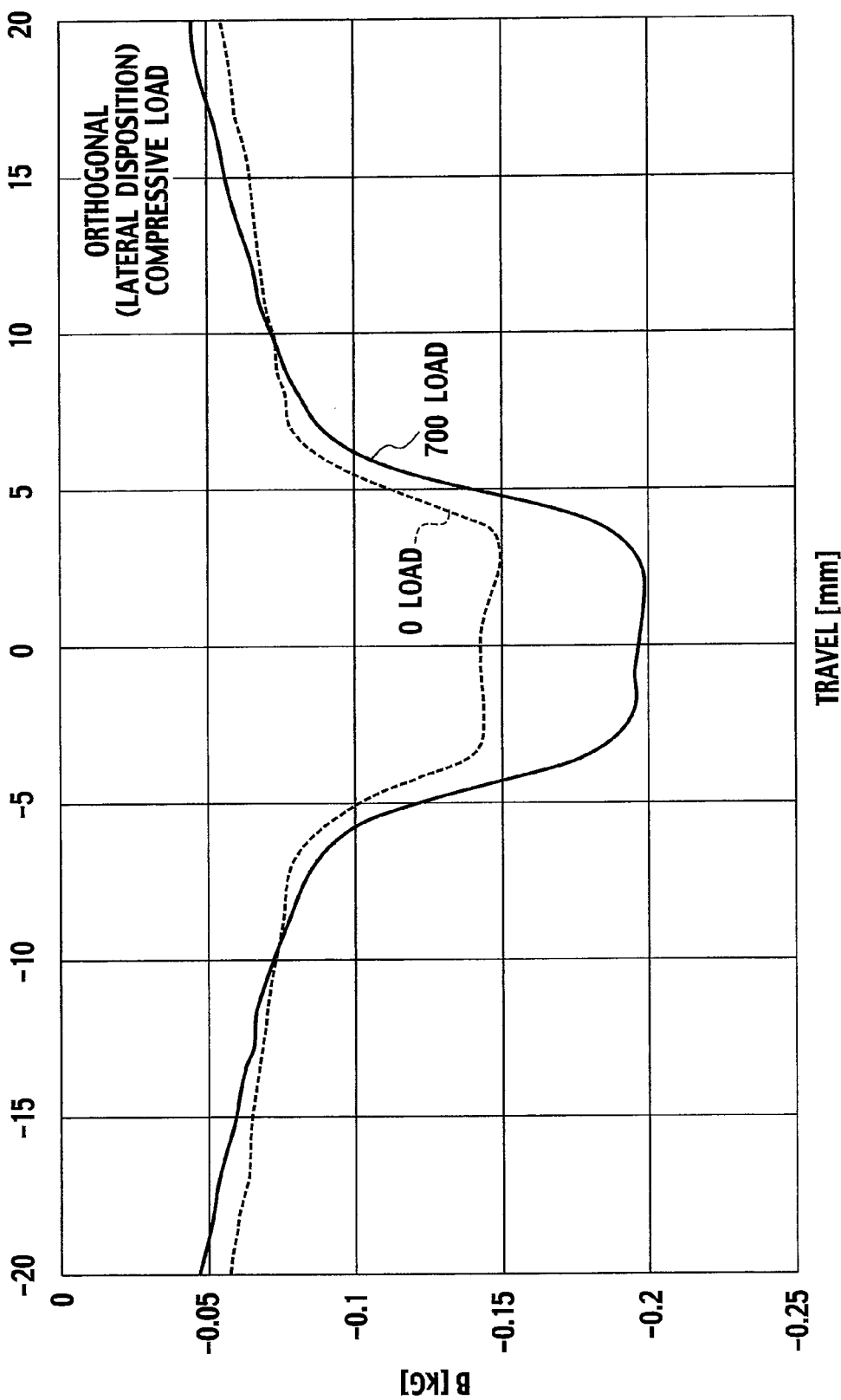
FIG. 16 is a graph showing measurement results of the magnetic flux density with a compressive load applied in a state that the permanent magnet is so disposed that the direction of the stress acting on the test piece is substantially orthogonal to the magnetizing direction of the permanent magnet (lateral disposition).
Figure 17:
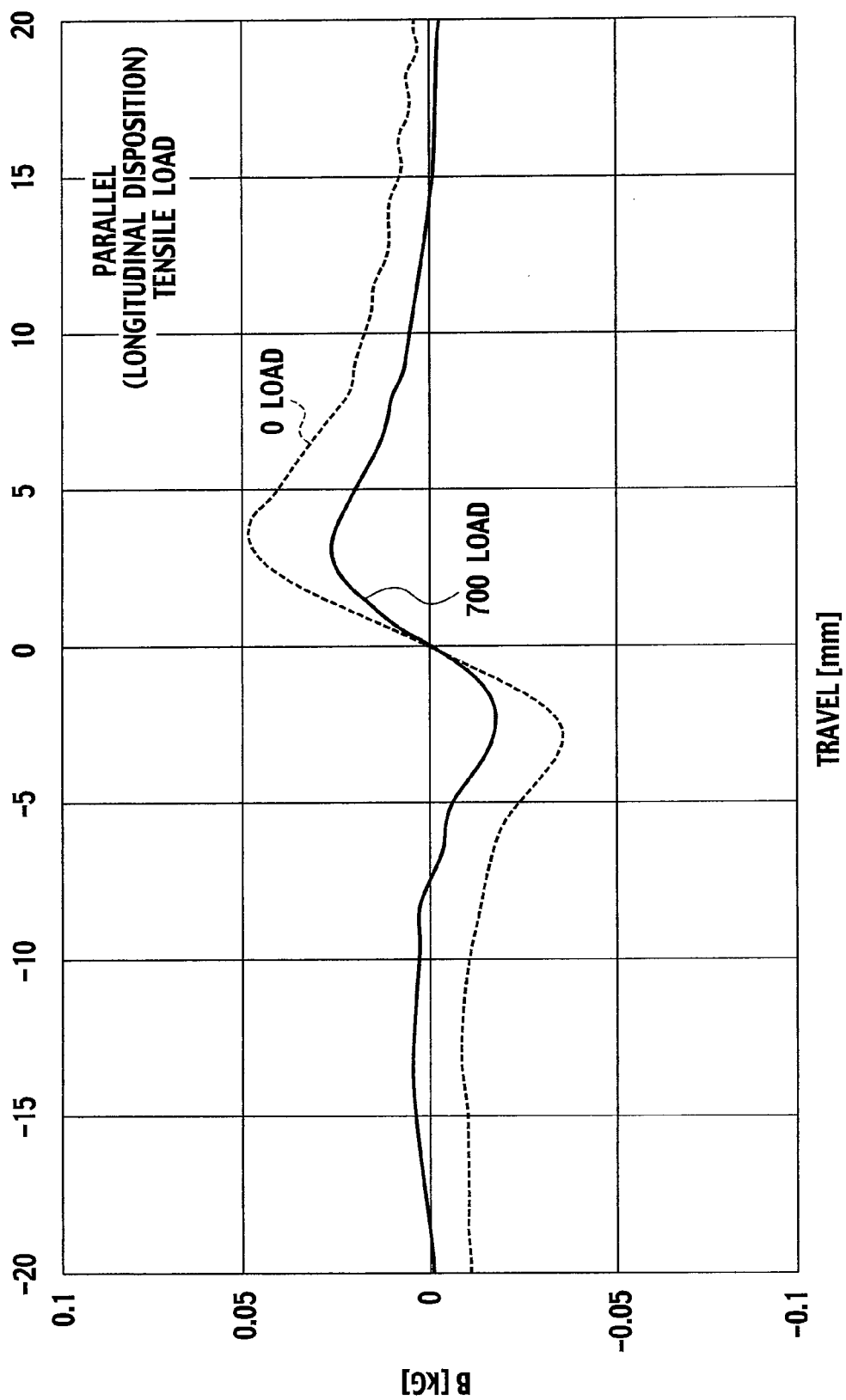
FIG. 17 is a graph showing measurement results of the magnetic flux density with the tensile load applied in a state that the permanent magnet is so disposed that the direction of the stress acting on the test piece is substantially parallel to the magnetizing direction of the permanent magnet (longitudinal disposition).
Figure 18:
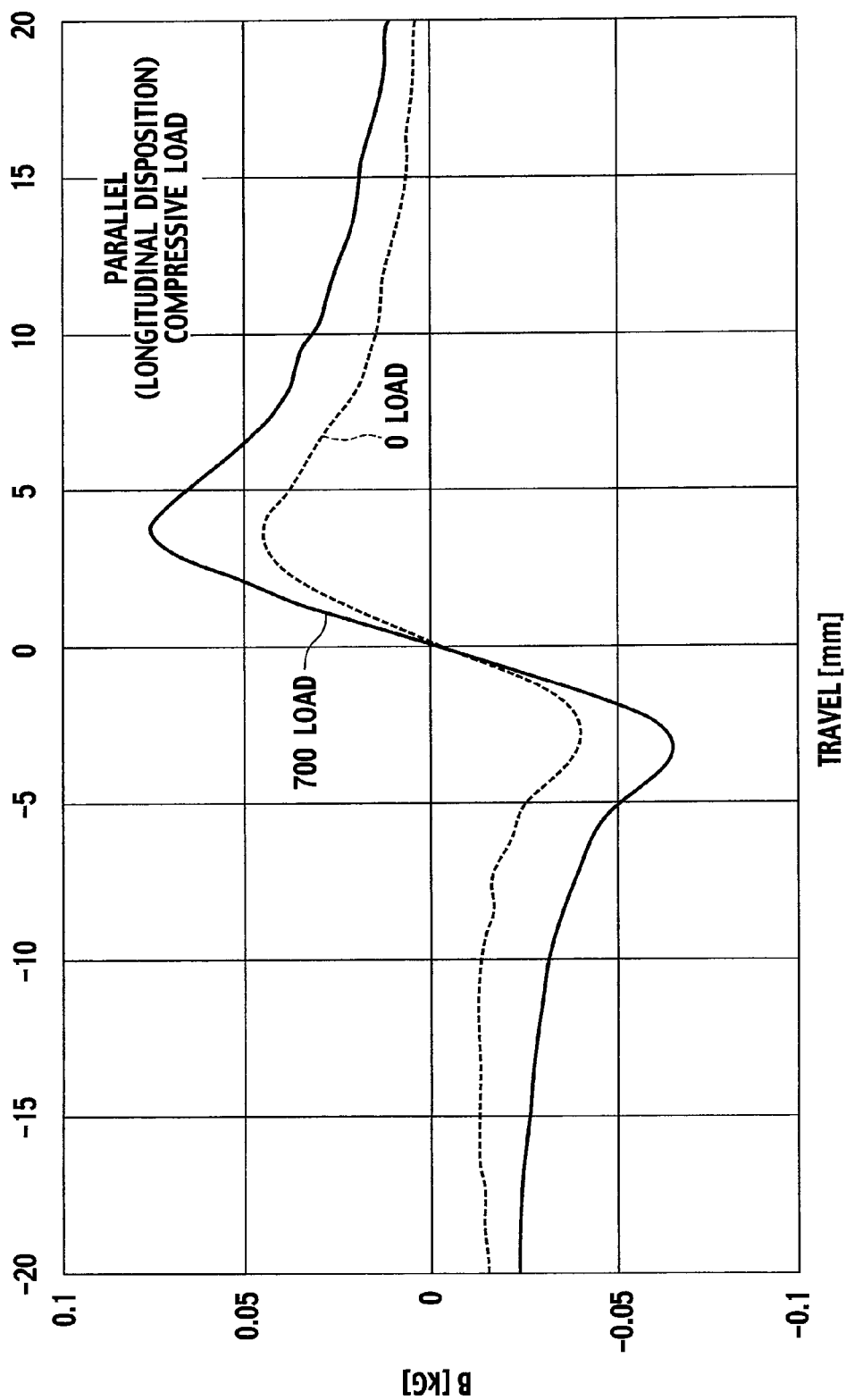
FIG. 18 is a graph showing measurement results of the magnetic flux density with the compressive load applied in a state that the permanent magnet is so disposed that the direction of the stress acting on the test piece is substantially parallel to the magnetizing direction of the permanent magnet (longitudinal disposition).

FIG. 15 is a graph showing measurement results of the magnetic flux density with the tensile load applied in a state that the permanent magnet 230 is so disposed that the direction (arrow 221) of the stress acting on the test piece 220 is substantially orthogonal to the magnetizing direction (arrow 231) of the permanent magnet 230 (lateral disposition). FIG. 16 is a graph showing measurement results of the magnetic flux density with the compressive load applied in a state that the permanent magnet 230 is so disposed that the direction of the stress acting on the test piece 220 is substantially orthogonal to the magnetizing direction of the permanent magnet 230 (lateral disposition). FIG. 17 is a graph showing measurement results of the magnetic flux density with the tensile load applied in a state that the permanent magnet 230 is so disposed that the direction of the stress acting on the test piece 220 is substantially parallel to the magnetizing direction of the permanent magnet 230 (longitudinal disposition). FIG. 18 is a graph showing measurement results of the magnetic flux density with the compressive load applied in a state that the permanent magnet 230 is so disposed that the direction of the stress acting on the test piece 220 is substantially parallel to the magnetizing direction of the permanent magnet 230 (longitudinal disposition).

In the graph of each of FIG. 15 to FIG. 18, the abscissa denotes travel (mm) of the probe 240. The start point P1 corresponds to a position of −20 mm, the central point P0 of the parallel part corresponds to a position of 0 (zero) mm, and the end point P2 corresponds to a position of +20 mm. The ordinate denotes magnetic flux density B [kG]. In each graph, the actual line denotes a magnetic flux density measured by applying a load, while the broken line denotes a magnetic flux density at a load 0 (zero).

Referring to FIG. 15 and FIG. 17, the magnetic flux density with the tensile load applied to the test piece 220 was lower than the magnetic flux density at load 0. Referring to FIG. 16 and FIG. 18, the magnetic flux density with the compressive force applied to the test piece 220 was higher than the magnetic flux density at load 0. Referring to FIG. 15 and FIG. 16, at the central point P0 (0 mm) of the parallel part, the magnetic flux density was changed (decreased) by 37 G in the case of the tensile load while the magnetic flux density was changed (increased) by 55 G in the case of the compressive load, and therefore the sensitivity was lower when the tensile load was applied.

Referring to FIG. 15 and FIG. 16, when the permanent magnet 230 was disposed laterally, there was an area where the sensitivity is substantially constant. The area where the sensitivity is substantially constant was smaller than the φ diameter (10 mm) of the permanent magnet 30. Meanwhile, referring to FIG. 17 and FIG. 18, when the permanent magnet 230 was disposed longitudinally, the maximum sensitivity appeared as a peak. In addition, the peak position of sensitivity was shifted according to scale of load. For example, as shown in FIG. 17, the peak position of sensitivity in the case of tensile load was shifted inward (opposite to the start point P1 and opposite to the end point P2) relative to the peak position of sensitivity in the case of load 0.

For forming the magnetostrictive stress sensor, the sensing position for measuring the magnetic flux density by disposing the magnetic sensor is required to be specified in a position having high sensitivity stability. When the permanent magnet 230 is disposed longitudinally, the maximum sensitivity appears as a peak, in addition, the peak position of sensitivity is shifted according to scale of load, making it difficult to specify the sensing position. It is possible to obtain the peak position of sensitivity by this experiment. However, when the magnetostrictive stress sensors are mass-produced, such production may cause a great variation. Meanwhile, when the permanent magnet 230 is disposed laterally, the area where the sensitivity is substantially constant is made, thereby easily specifying the sensing position. In other words, when the permanent magnet 230 is disposed laterally, the sensing position may be specified in the center position on the backface of the permanent magnet 230 or close to the center position. Moreover, when the permanent magnet 230 is disposed laterally, it is unnecessary to set the peak position of sensitivity through experiments and the variation of the magnetostrictive stress sensors in mass-production can be suppressed.

With the permanent magnet 230 disposed longitudinally, the peak position of sensitivity is shifted according to scale of load, thus losing linearity of sensor output. As such, for forming the magnetostrictive stress sensor, the above shifting should be corrected, thus complicating circuit or control program. Contrary to this, with the permanent magnet 230 disposed laterally, there is the area where the sensitivity is substantially constant, thereby the sensor output can linearly change according to the scale of load, thus preventing the circuit or control program from being complicated.

When the permanent magnet 230 is disposed longitudinally: of magnetic fluxes of the permanent magnet 230, a magnetic flux that is not influenced by stress cannot be monitored. As such, securing temperature characteristics of the magnetostrictive stress sensor is complicated and cumbersome. Meanwhile, when the permanent magnet 230 is disposed laterally: of both poles of the permanent magnet 230, a pole on a side not contacting the magnetic member 220 is not directly influenced by the stress, thereby making it possible to monitor the magnetic flux which is scarcely influenced by the stress. As such, securing temperature characteristics of the magnetostrictive stress sensor is easy, which is an advantage.

For forming the magnetostrictive stress sensor, the greater the $\Delta B/B0$ is, the higher the sensing precision/accuracy is. Herein, $\Delta B$ denotes magnetic flux density change which depends on stress, and $B0$ denotes a magnetic flux density at load 0. When the permanent magnet 230 is disposed longitudinally or laterally, the leak magnetic flux on a side opposite to the permanent magnet 230 with respect to the test piece 220 is detected, thus lowering the level of magnetic flux density $B0$ at load 0. As set forth above, however, when the permanent magnet 230 is disposed laterally, there is the area where the sensitivity is substantially constant, thus making it easy to specify the sensing position and linearly changing the sensor output, which are advantages, unlike the longitudinal disposition. As such, when the permanent magnet 230 is disposed laterally, the magnetic flux density change $\Delta B$ which depends on stress can be detected more accurately than when the permanent magnet 230 is disposed longitudinally, resulting in more accurate and more precise detection of stress.

When the permanent magnet 230 is disposed laterally, the permanent magnet 230 can be made small. Unless the $B0$ is as large as a certain amount, the $\Delta B$ cannot be made great, either. As shown in FIG. 15 to FIG. 18, $B0$ is about 150 G in the case of the lateral disposition and about 50 G in the case of the longitudinal disposition. Meanwhile, the $\Delta B$ is about 50 G in the case of the lateral disposition and about 25 G in the case of the longitudinal disposition. Since the $B0$ denotes a leak magnetic flux density, it is necessary for the magnet to magnetize the magnetostrictive material close to a saturation state. For this object, the magnet's magnetic pole end face closer to the magnetostrictive material can be effectively magnetized. This is because the magnetic field from the magnet gets weaker in a position more away from the magnetic pole end face. When the permanent magnet 230 is disposed laterally, even a small magnet can magnetize the magnetostrictive material. In the case of the longitudinal disposition, however, for obtaining the $B0$ same as that obtained by the lateral disposition, it is necessary to enlarge the magnet As such, in the case of the lateral disposition of the permanent magnet 230, the permanent magnet 230 can be essentially made small, thus miniaturizing the magnetostrictive stress sensor.

Moreover, for forming the magnetostrictive stress sensor in the case of the lateral disposition of the permanent magnet 230, a yoke can be easily disposed in such a manner as to face a pole (of both poles of the permanent magnet 230) not contacting the magnetic member 220. Providing the yoke for the permanent magnet 230 is equivalent to increasing of permeance of magnet, thus the permanent magnet 230 can be used at high permeance, and thereby stable magnetic characteristics can be utilized. As such, still thinner magnet can be used, which is proper for making the magnetostrictive stress sensor still smaller.

Moreover, when the permanent magnet 230 is disposed laterally, symmetry in 2-dimensional direction capable of using a disk-like small magnet, namely, symmetry on a face parallel to the magnet's end face can be obtained. As such, the lateral disposition is effectively applied to the sensor. The disk-like magnet can be easily subjected to polishing and the like and thereby is prepared with ease. Meanwhile, when the permanent magnet 230 is disposed longitudinally, miniaturizing the magnetostrictive stress sensor is rather difficult and a relatively long magnet is required, compared with the lateral disposition.

Second Embodiment

Figure 3:
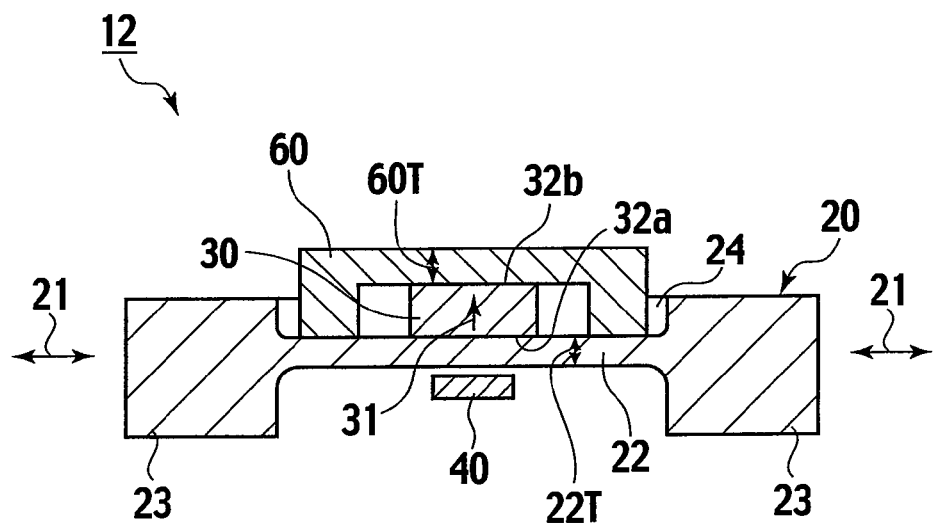
FIG. 3 is a cross sectional view showing a magnetostrictive stress sensor according to a second embodiment of the present invention.

FIG. 3 is a cross section showing a magnetostrictive stress sensor 12, according to a second embodiment of the present invention. Members common to those according to the first embodiment are denoted by the same numerals or signs and therefore an explanation thereof is to be partly omitted.

The magnetostrictive stress sensor 12 according to the second embodiment is different from the magnetostrictive stress sensor 11 according to the first embodiment, in that a first yoke 60 is disposed in such a manner as to face the permanent magnet 30.

The first yoke 60 made from the material same as that of the magnetic member 20 is disposed on the magnetostrictive stress sensor 12, in such a manner as to face the second end face 32b opposite to the first end face 32a facing the magnetic member 20, of the first end face 32a and second end face 32b which are orthogonal to the magnetizing direction (refer to arrow 31). The first yoke 60 is so disposed as to contact the second end face 32b of the permanent magnet 30 and to cover the permanent magnet 30. Moreover, the first yoke 60 is so disposed as not to block the strain at the strain-causing part 22 of the magnetic member 20.

Providing the first yoke 60 for the permanent magnet 30 is equivalent to an increased permeance of the magnet and thereby the permanent magnet 30 can be used at a high permeance state, thus utilizing stable magnetic characteristics. As such, a thin magnet can be used for the permanent magnet 30, thus miniaturizing the magnetostrictive stress sensor 12. Moreover, preparing the first yoke 60 with the material same as that of the magnetic member 20 can secure temperature characteristics of the magnetostrictive stress sensor 12, to be set forth afterward.

It is preferable that the magnetic member 20's thickness (22T) of a part facing the first end face 32a of the permanent magnet 30 is the same as the first yoke 60's thickness 60T of a part facing the second end face 32b of the permanent magnet 30. In other words, it is preferable that a thickness 22T of the strain-causing part 22 of the magnetic member 20 is the same as the first yoke 60's thickness 60T of a part facing the strain-causing part 22. The above is for accomplishing good temperature characteristics of the magnetostrictive stress sensor 12, to be set forth afterward.

Third Embodiment

Figure 4:
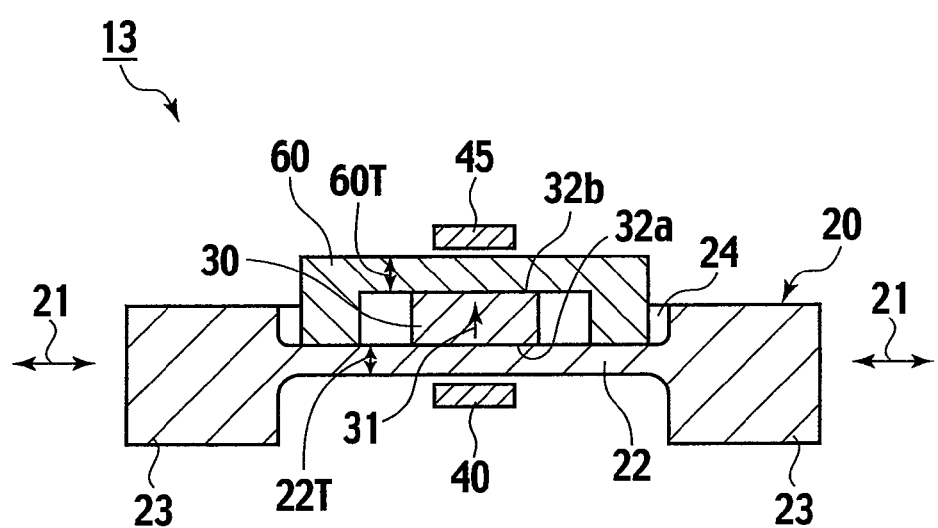
FIG. 4 is a cross sectional view showing a magnetostrictive stress sensor according to a third embodiment of the present invention.

FIG. 4 is a cross section showing a magnetostrictive stress sensor 13, according to a third embodiment of the present invention. Members common to those according to the first and second embodiments are denoted by the same numerals or signs and therefore an explanation thereof is to be partly omitted.

The magnetostrictive stress sensor 13 according to the third embodiment is different from the magnetostrictive stress sensor 12 according to the second embodiment, in that other than the first magnetic sensor 40, there is provided a second magnetic sensor 45 (otherwise referred to as "another magnetic sensor 45") for monitoring a magnetic flux of the permanent magnet 30 in a state not depending on the stress acting on the magnetic member 20.

In addition to the structure of the magnetostrictive stress sensor 12 according to the second embodiment, the magnetostrictive stress sensor 13 has such a structure that the second magnetic sensor 45 is disposed outside the first yoke 60. The second magnetic sensor 45 detects the magnetic flux of the permanent magnet 30. Moreover, a sensor output is defined as a differential output between an output of the first magnetic sensor 40 and an output of the second magnetic sensor 45. Like the second embodiment, the first yoke 60 is made from the material same as that for the magnetic member 20. Moreover, the thickness 22T of the strain-causing part 22 of the magnetic member 20 is the same as the first yoke 60's thickness 60T of a part facing the strain-causing part 22.

Two sensors including the first magnetic sensor 40 for detecting stress and the second magnetic sensor 45 for monitoring the magnetic flux of the permanent magnet 30 in a state not depending on stress are provided. Moreover, as an output of the magnetostrictive stress sensor 13, the differential output between the output of the first magnetic sensor 40 and the output of the second magnetic sensor 45 is defined. As such, the magnetostrictive stress sensor 13 excellent in temperature characteristic can be made. That is, since the first yoke 60 and the strain-causing part 22 have the same material and the same thickness (22T=60T), a leak magnetic flux in a position where the active first magnetic sensor 40 free from the applied stress is disposed and a leak magnetic flux in a position where the dummy second magnetic sensor 45 for monitoring the magnetic flux can be made to have substantially the same scale. Moreover, differentiating the active first magnetic sensor 40 from the dummy second magnetic sensor 45 for defining the output of the magnetostrictive stress sensor 13 can make the magnetostrictive stress sensor 13 excellent in temperature characteristic.

The greatest advantage for adopting the basic structure of the magnetostrictive stress sensor of the present invention is that the magnetic flux of the permanent magnet 30 can be monitored stably and securely.

The structure of the conventionally proposed magnetostrictive stress sensor 205 shown in FIG. 1(A) cannot monitor the magnetic flux which is not influenced by stress. As such, problems such as securing temperature characteristics of the magnetostrictive stress sensor 205 is complicated and cumbersome are included in the conventional structure.

Meanwhile, the structure of the present invention is not directly influenced by the stress, thereby making it possible to monitor the magnetic flux which is scarcely influenced by the stress. As such the structure of the present invention is excellent in that the temperature characteristics of the magnetostrictive stress sensor can be easily secured.

Fourth Embodiment

Figure 5:
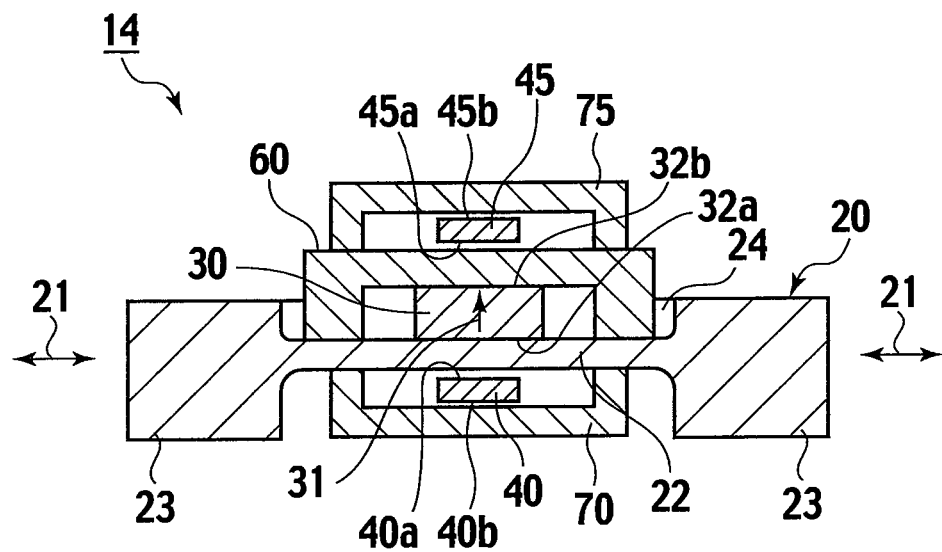
FIG. 5 is a cross sectional view showing a magnetostrictive stress sensor according to a fourth embodiment of the present invention.

FIG. 5 is a cross section showing a magnetostrictive stress sensor 14, according to a fourth embodiment of the present invention. Members common to those according to the first to third embodiments are denoted by the same numerals or signs and therefore an explanation thereof is to be partly omitted.

The magnetostrictive stress sensor 14 according to the fourth embodiment is different from the magnetostrictive stress sensor 13 according to the third embodiment, in that a second yoke 70 is so disposed as to face the first magnetic sensor 40.

In addition to the structure of the magnetostrictive stress sensor 13 according to the third embodiment, the magnetostrictive stress sensor 14 has such a structure that, the second yoke 70 (for first magnetic sensor 40) made from a soft magnetic material is disposed in such a manner as to face a second face 40b (of first face 40a and second face 40b of first magnetic sensor 40 on the active side) opposite to a first face 40a facing the magnetic member 20. The second yoke 70 is so disposed as to cover the first magnetic sensor 40, and not to block strain of the strain-causing part 22 of the magnetic member 20.

As the soft magnetic material for the second yoke 70, electrical steel sheet, electromagnetic soft iron, soft ferrite, permalloy and the like are used which are small in coercive force.

Providing the second yoke 70 for the first magnetic sensor 40 brings about an effect of collecting the magnetic flux, thus increasing the sensitivity of the magnetostrictive stress sensor 14 by about double. Moreover, the magnetic sensing characteristic becomes dull relative to positioning of the first magnetic sensor 40, which is an advantage. Moreover, the first magnetic sensor 40 is shielded against an outer magnetic field, thus improving durability against the outer magnetic field.

In FIG. 5, a third yoke 75 is also disposed at the second magnetic sensor 45 on the dummy side. Of the first and second faces 45a, 45b of the second magnetic sensor 45 on the dummy side, the third yoke 75 for the second magnetic sensor 45 is so disposed as to face the second face 45b opposite to the first face 45a facing the first yoke 60. The third yoke 75 is also made from the above soft magnetic material. The third yoke 75 is so disposed as to cover the second magnetic sensor 45. The third yoke 75 exhibits a function like that of the second yoke 70.

Fifth Embodiment

Figure 6:
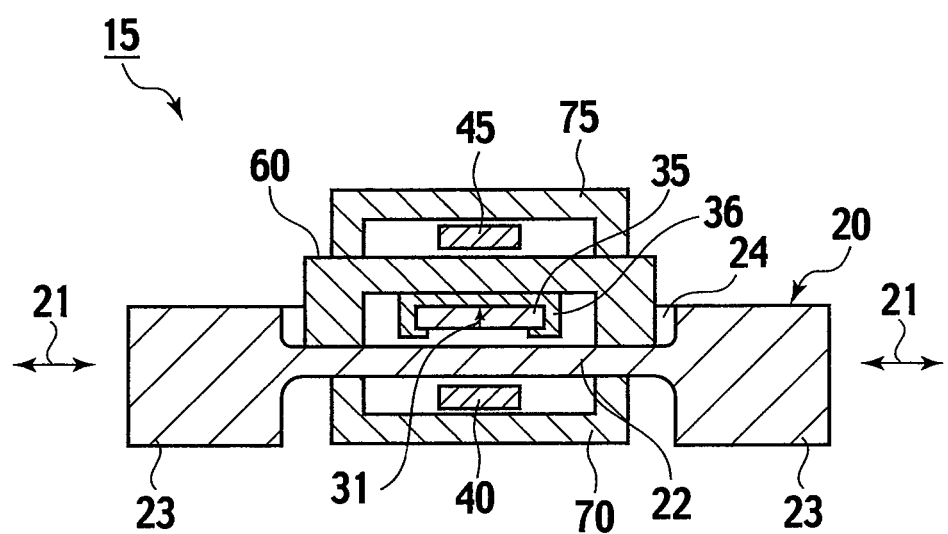
FIG. 6 is a cross sectional view showing a magnetostrictive stress sensor according to a fifth embodiment of the present invention.

FIG. 6 is a cross section showing a magnetostrictive stress sensor 15, according to a fifth embodiment of the present invention. Members common to those according to the first to fourth embodiments are denoted by the same numerals or signs and therefore an explanation thereof is to be partly omitted.

The magnetostrictive stress sensor 15 according to the fifth embodiment is different from the magnetostrictive stress sensor 14 according to the fourth embodiment, in that a permanent magnet 35 is disposed away from the magnetic member 20 and the first yoke 60. According to the fourth embodiment, the permanent magnet 30 is disposed in such a state that the first end face 32a and the second end face 32b respectively contact the strain-causing part 22 of the magnetic member 20 and the first yoke 60.

The magnetostrictive stress sensor 15 holds the permanent magnet 35 via a spacer 36 made from a non-magnetic material. Intervening the spacer 36 allows the permanent magnet 35 to be disposed away from the magnetic member 20 and first yoke 60. In this way, even when the permanent magnet 35 does not contact the magnetic member 20 or first yoke 60, sufficient sensing characteristics can be secured.

Sixth Embodiment

Figure 7:
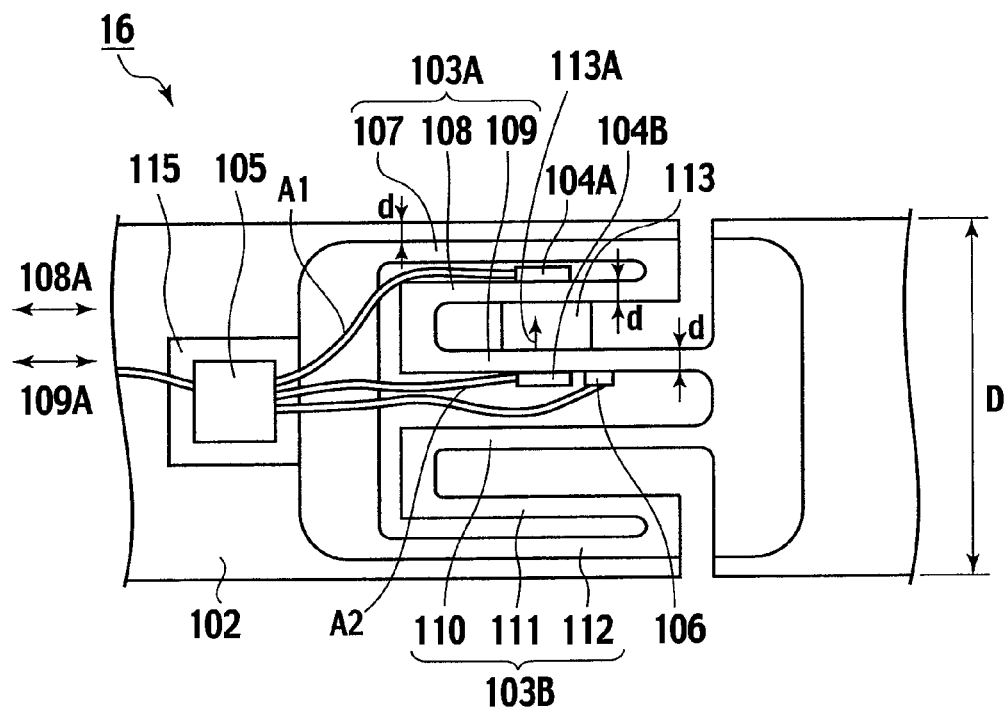
FIG. 7 is a plan view showing a magnetostrictive stress sensor according to a sixth embodiment of the present invention.
Figure 8:
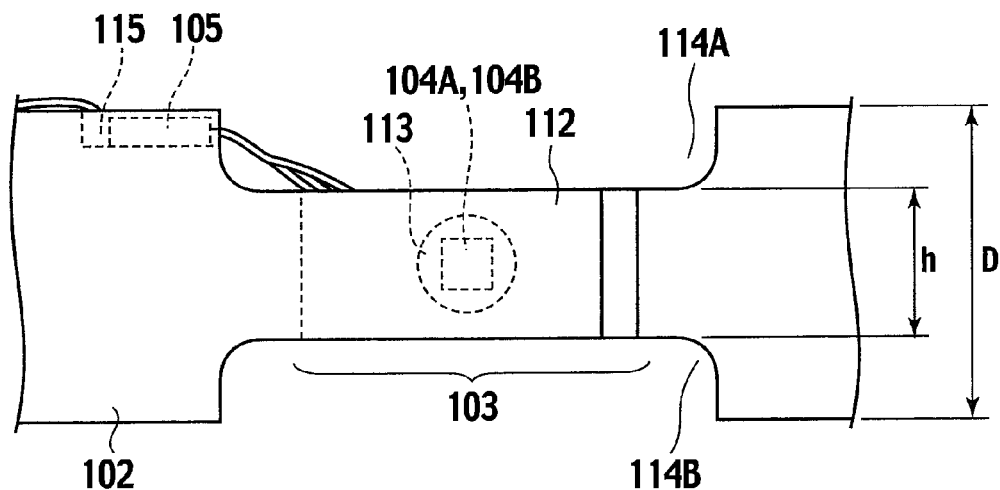
FIG. 8 is a side view showing the magnetostrictive stress sensor according to the sixth embodiment of the present invention.
Figure 9:
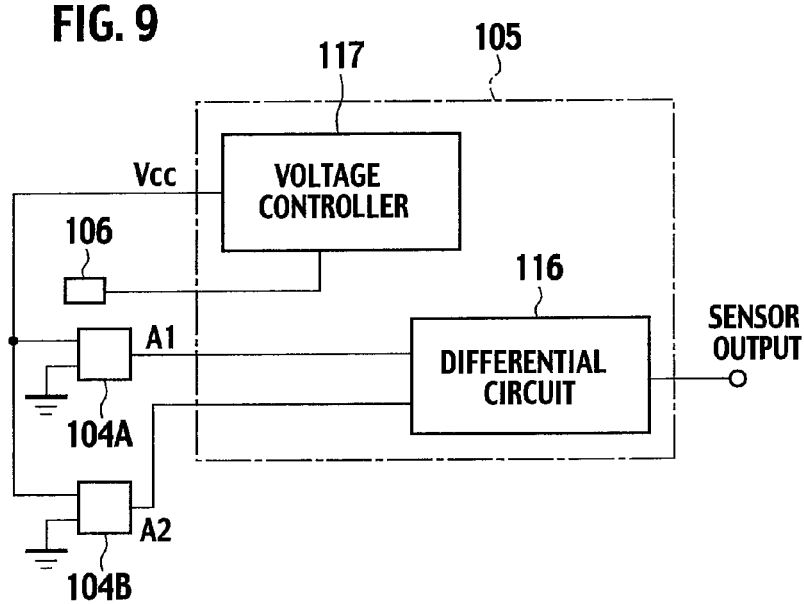
FIG. 9 is a block diagram for explaining a temperature compensating circuit of the magnetostrictive stress sensor according to the sixth embodiment of the present invention.

FIG. 7 and FIG. 8 are respectively a plan view and a cross sectional view each showing a magnetostrictive stress sensor 16, according to a sixth embodiment of the present invention. FIG. 9 is a block diagram for explaining temperature compensating circuit of the magnetostrictive stress sensor 16.

The magnetostrictive stress sensor 16 according to the sixth embodiment is different from the magnetostrictive stress sensors 11, 12, 13, 14, 15 according to the respective first to fifth embodiments, in that the magnetostrictive stress sensor 16 is adopted for a shaft member 102 on which an axial force (axial tensile force and axial compressive force) acts.

The magnetostrictive stress sensor 16 includes a second magnetic member 108 (counterpart of the first member) and a third magnetic member 109 (counterpart of the second member) which are adjacent to each other in such a manner as to form a pairwise formation in a direction orthogonal to an axial direction of the shaft member 102 on which the axial force acts. The acting axial force causes a tensile force to one of the second and third magnetic members 108, 109 and a compressive force to the other of the second and third magnetic members 108, 109. A permanent magnet 113 is disposed between the second magnetic member 108 and the third magnetic member 109. The magnetostrictive stress sensor 16 includes a first magnetic sensor 104A disposed opposite to the permanent magnet 113 with respect to the second magnetic member 108 and a second magnetic sensor 104B disposed opposite to the permanent magnet 113 with respect to the third magnetic member 109. The sixth embodiment is the same as the first to fifth embodiments in that each of the directions (refer to arrow 108A and arrow 109A) of the axial forces acting respectively on the second magnetic member 108 and third magnetic member 109 is substantially orthogonal to a magnetizing direction (arrow 113A) of the permanent magnet 113.

Each of the axial directions (refer to arrow 108A and arrow 109A) of the axial forces acting respectively on the second magnetic member 108 and the third magnetic member 109 is substantially orthogonal to the magnetizing direction (refer to arrow 113A) of the permanent magnet 113. As such, the sixth embodiment can accurately and precisely detect the axial forces acting respectively on the second magnetic member 108 and third magnetic member 109, like the first embodiment can accurately and precisely detect the stress acting on the magnetic member 20. Moreover, the permanent magnet 113 is so disposed that each of the axial directions (refer to arrow 108A and arrow 109A) is substantially orthogonal to the magnetizing direction of the permanent magnet 113, thus substantially miniaturizing the permanent magnet 113, as set forth above. A dimension along the magnetizing direction of the permanent magnet 113 can be smaller than a dimension orthogonal to the magnetizing direction of the permanent magnet 113. As such, according to the sixth embodiment where the axial force direction (refer to arrow 108A and arrow 109A) and the magnetizing direction (refer to arrow 113A) are substantially orthogonal, the dimension between the second magnetic member 108 and the third magnetic member 109 for disposing therebetween the permanent magnet 113 may be smaller compared with such a case that the permanent magnet 113 is so disposed that the axial force direction is substantially parallel to the magnetizing direction. As such, a thickness of the second magnetic member 108 and a thickness of the third magnetic member 109 may be large within a limited range of the shaft member 102, thereby thickening the second magnetic member 108 and third magnetic member 109, thus preventing decreased strength of the second magnetic member 108 and third magnetic member 109. In addition, the thickened second magnetic member 108 and third magnetic member 109 as magnetic materials can prevent drastically-decreased sensitivity. In the following description, the magnetostrictive stress sensor 16 is to be set forth in detail which is applied to an axial member on which an axial force acts. For convenience' sake, therefore, the magnetostrictive stress sensor 16 is referred to as magnetostrictive axial force sensor 16.

The magnetostrictive axial force sensor 16 according to the sixth embodiment includes: a return part 103 formed in the shaft member 102 to be measured; the permanent magnet 113 and two magnetic sensors (the first magnetic sensor 104A and second magnetic sensor 104B) which magnet and sensors are disposed on the return part 103; a circuit part 105 for inputting output signals A1, A2 from the first and second magnetic sensors 104A, 104B and then outputting a sensor output as magnetostrictive stress sensor; and a temperature sensor 106.

The shaft member 102 is formed by machining a maraging steel. Use of the maraging steel is preferable in terms of robustness, sensitivity and sensing characteristics of the magnetostrictive axial force sensor 16. Moreover, 18% Ni-base maraging steel is preferable due to its large magnetostriction. When used in an aging state, 18% Ni-base maraging steel shows a good characteristic free of hysteresis, making it more preferable.

An axial force (axial tensile force and axial compressive force) acts on the shaft member 102, and the return part 103 is formed in such a manner as to be returned several times in the axial direction. Along an axial center, the return part 103 has symmetrical two parts, that is, a first return part 103A and a second return part 103B. According to the sixth embodiment, it is the first return part 103A that is provided with the permanent magnet 113, the first magnetic sensor 104A and the second magnetic sensor 104B.

The first return part 103A includes a first magnetic member 107 extending from one side (left in FIG. 7) to the other side (right in FIG. 7) in the axial direction on an outer periphery of the shaft member 102, a second magnetic member 108 returned from an end part on the other side of the first magnetic member 107 and then extending oppositely in the axial direction, a third magnetic member 109 returned from an end part on one side of the second magnetic member 108 and then extending oppositely in the axial direction to be connected to the other side of the shaft member 102. The first to third magnetic members 107 to 109 are parallel to each other and each of which is formed into a plate. Being plate-like in configuration, the first to third magnetic members 107 to 109 can have high actual stress. As such, stress acting on the first to third magnetic members 107 to 109 can be detected with good sensitivity.

A width h in the widthwise direction orthogonal to both of the arranging direction (direction orthogonal to plate face) of the first to third magnetic members 107 to 109 and the axial direction is formed to have a unified length which is shorter than a shaft diameter D of the shaft member 102. As such, outside the return part 103 in the widthwise direction, there are formed spaced parts 114A, 114B which are each dented from the shaft member 102.

The second return part 103B which is symmetrical with the first return part 103A has fourth to sixth magnetic members 110 to 112 which are respectively symmetrical with the first to third magnetic members 107 to 109. As such, the first return part 103A and second return part 103B are formed with six members (even number) in total including the first to sixth magnetic members 107 to 112.

The first to sixth magnetic members 107 to 112 each have, for example, a thickness d of 1 mm. The first magnetic member 107 and sixth magnetic member 112, which form outer peripheral faces of the shaft, may have thicknesses which vary with parts thereof. For example, a plate of the thinnest part has a thickness of 1 mm while an outer peripheral face may be machined flat.

The permanent magnet 113 is disposed between the second magnetic member 108 and the third magnetic member 109. The second faces of the respective second magnetic member 108 and third magnetic member 109 which faces are opposite to the respective first faces for disposing the permanent magnet 113 are provided with the first magnetic sensor 104A and second magnetic sensor 104B respectively. The magnetizing direction (refer to arrow 113A) of the permanent magnet 113 coincides with the direction (upper and lower in FIG. 7) orthogonal to the second and third magnetic members 108, 109's faces contacting the permanent magnet 113 and is orthogonal to the directions (rightward and leftward in FIG. 7) of the stress caused to the second magnetic member 108 and third magnetic member 109. Herein, the second magnetic member 108 and third magnetic member 109 to which the respective first magnetic sensor 104A and second magnetic sensor 104B are mounted have the equal thickness d and equal width h and have an equal cross section orthogonal to the axial direction. Thereby, tensile stress and compressive stress having opposite directions (positive and negative) and an equal absolute value act on the second magnetic member 108 and third magnetic member 109.

The permanent magnet 113 is disposed between a plate member of the second magnetic member 108 and a plate member of the third magnetic member 109. In this case, a leak magnetic flux is caused to the second faces (for disposing the first and second magnetic sensors 104A, 104B) of the respective second and third magnetic members 108, 109 which faces are disposed opposite to the first faces for disposing the permanent magnet 113.

When, for example, a tensile force acts on the shaft member 102, a tensile stress is caused to the first, third, fourth and sixth magnetic members 107, 109, 110 and 112 while causing a compressive force to the second and fifth magnetic members 108 and 111. On the other hand, when a compressive force acts on the shaft member 102, a compressive stress is caused to the first, third, fourth and sixth magnetic members 107, 109, 110 and 112 while causing a tensile force to the second and fifth magnetic members 108 and 111. As such, when any one of the tensile force and compressive force acts on the shaft member 102, both of the tensile force and compressive force are caused to a pair of the magnetic members (the second and third magnetic members 108 and 109 according to the sixth embodiment) adjacent to each other in the direction orthogonal to the axial direction. With the axial stress caused to the second magnetic member 108 and third magnetic member 109, the leak magnetic fluxes of the first magnetic sensor 104A and second magnetic sensor 104B change due to an effect of a reverse magnetostriction.

For example, when the tensile stress is applied to the second magnetic member 108 or third magnetic member 109, the magnetic flux from the permanent magnet 113 is likely to permeate through the second magnetic member 108 or third magnetic member 109, thus decreasing the leak magnetic flux. On the other hand, when the compressive stress is applied to the second magnetic member 108 or third magnetic member 109, the magnetic flux from the permanent magnet 113 is unlikely to permeate through the second magnetic member 108 or third magnetic member 109, thus increasing the leak magnetic flux. Decrease or increase of the leak magnetic flux can be detected with the first magnetic sensor 104A and second magnetic sensor 104B.

In the case of the shaft member 102 according to the sixth embodiment, the first return part 103A and the second return part 103B are formed symmetrical with each other along the axial center, thus accomplishing a structure that the axial force is balanced around the axial center and the shaft member 102 is unlikely to be deformed.

The first magnetic sensor 104A and second magnetic sensor 104B each are, for example, linear Hall IC. The output signals A1, A2 from the respective Hall ICs 104A, 104B are inputted to the circuit part 105. It is preferable that the circuit part 105 is integrated with a signal processing circuit of the magnetostrictive axial force sensor 16.

According to the sixth embodiment, the respective linear Hall ICs 104A, 104B simultaneously detect the magnetic flux changes which correspond to the tensile stress and compressive stress. As such, differentiating the output signals A1, A2 of the respective linear Hall ICs 104A, 104B can bring about a signal having substantially double sensitivity and secure a good linearity.

The temperature sensor 106 is mounted close to the linear Hall ICs 104A, 104B. That is, the temperature sensor 106 is mounted to any of the second magnetic member 108 and third magnetic member 109 to which the linear Hall ICs 104A, 10B are mounted respectively. In FIG. 7, the temperature sensor 106 is mounted to the linear Hall IC 104B. In addition, a position for mounting the temperature sensor 106 is not specifically limited as long as such a position can measure temperature environment of a portion causing the reverse magnetostriction.

The circuit part 105 is disposed in a receiving space 115 formed in the shaft member 102. The circuit part 105, which is receivable in a space of a part of the shaft member 102, can be made into a plug-in type small sensor. In addition, a position for disposing the circuit part 105 may be defined otherwise, for example, in the spaced parts 114A, 114B.

As shown in FIG. 9, the temperature measured by the temperature sensor 106 controls a supply voltage Vcc to the linear Hall ICs 104A, 104B, thus accomplishing temperature compensation of the magnetostrictive axial force sensor 16. As shown in FIG. 9, the output signals A1, A2 from the respective linear Hall ICs 104A, 104B are inputted to a differential circuit 116. The output differentiated by the differential circuit 116 serves as a sensor output of the magnetostrictive axial force sensor 16.

The signal from the temperature sensor 106 is inputted to a voltage controller 117, thus controlling the supply voltage Vcc to the linear Hall ICs 104A, 104B based on the signal from the temperature sensor 106. The zero point of the liner Hall ICs 104A, 104B is compensated for by the differentiation. The sensitivity of the linear Hall ICs 104A, 104B, the temperature dependency of the magnetic flux of the permanent magnet and the temperature dependency of the reverse magnetostriction are temperature-compensated by controlling the supply voltage Vcc.

For temperature compensating, it is necessary to calibrate in advance the voltage controller 117 such that two points having different temperatures have the same sensitivity. An area between the above two points is linearly interpolated while an area outside the above area is extrapolated.

Figure 10:
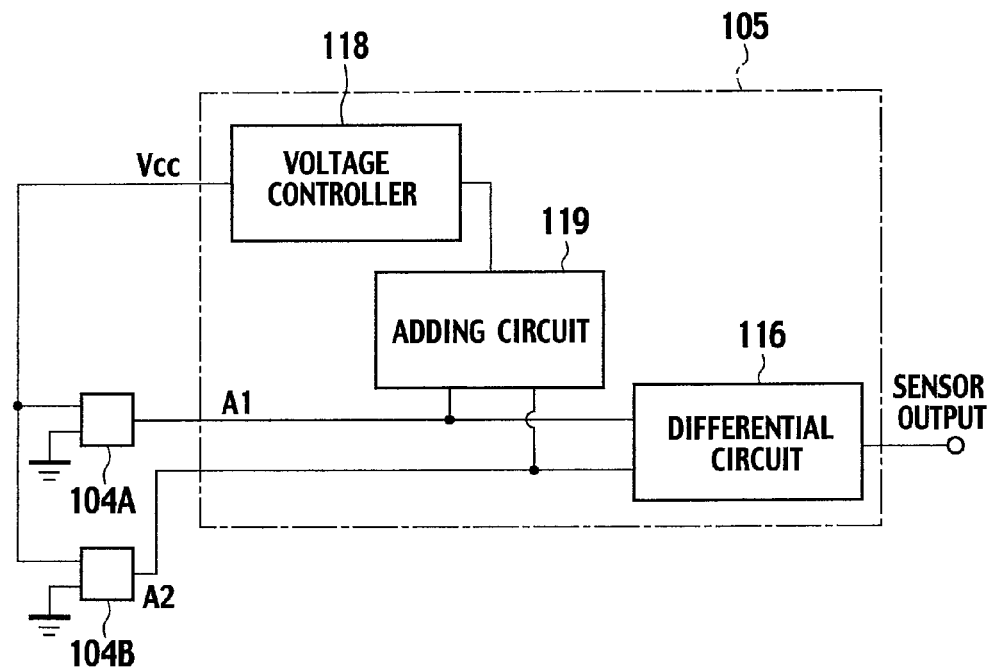
FIG. 10 is a block diagram for explaining another temperature compensating circuit of the magnetostrictive stress sensor according to the sixth embodiment of the present invention.
Figure 11:
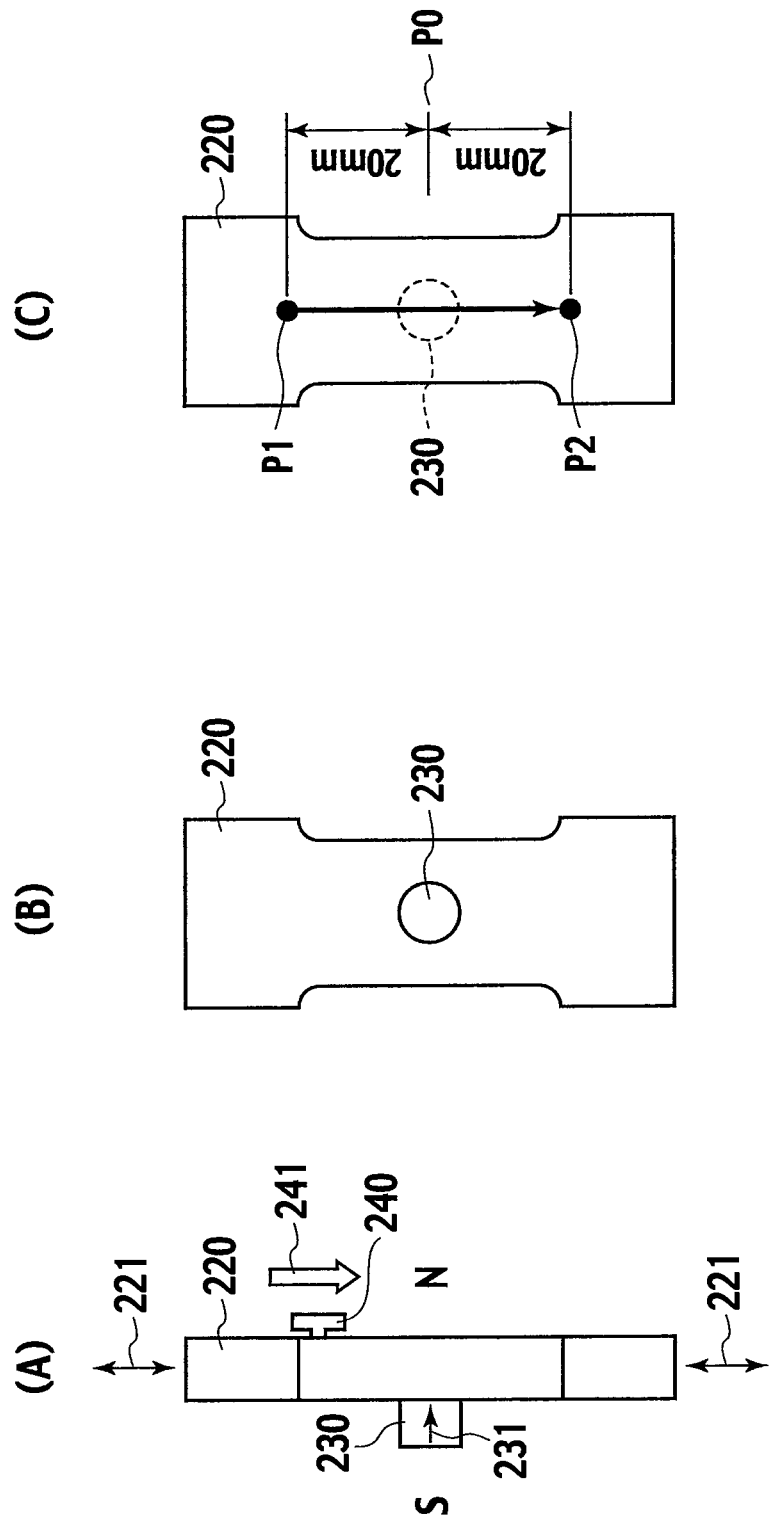
FIG. 11(A) to FIG. 11(C) explain experiments for checking how the direction of the stress acting on the magnetic member relative to the magnetizing direction of the permanent magnet affects detection of the stress, showing that the permanent magnet is so disposed that the direction of the stress acting on the magnetic member is substantially orthogonal to the magnetizing direction of the permanent magnet.
Figure 12:
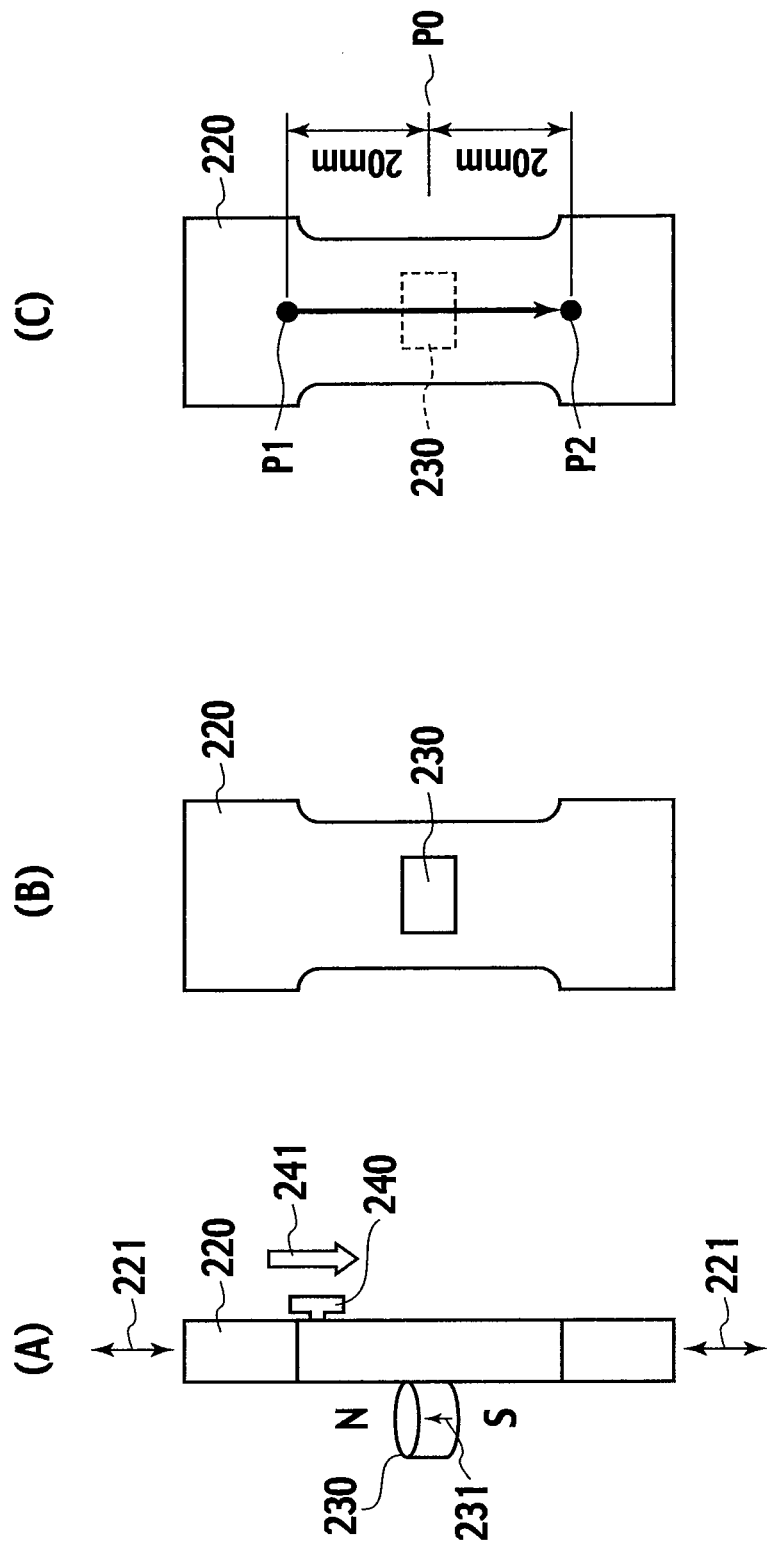
FIG. 12(A) to FIG. 12(C) explain experiments for checking how the direction of the stress acting on the magnetic member relative to the magnetizing direction of the permanent magnet affects detection of the stress, showing that the permanent magnet is so disposed that the direction of the stress acting on the magnetic member is substantially parallel to the magnetizing direction of the permanent magnet.
Figure 13:
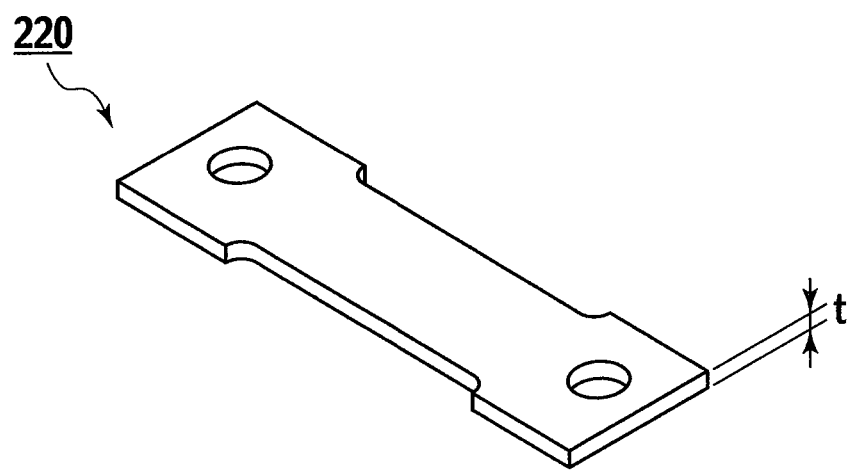
FIG. 13(A) and FIG. 13(B) are respectively a perspective view and a front view each showing the test piece as the magnetic member.
Figure 13:
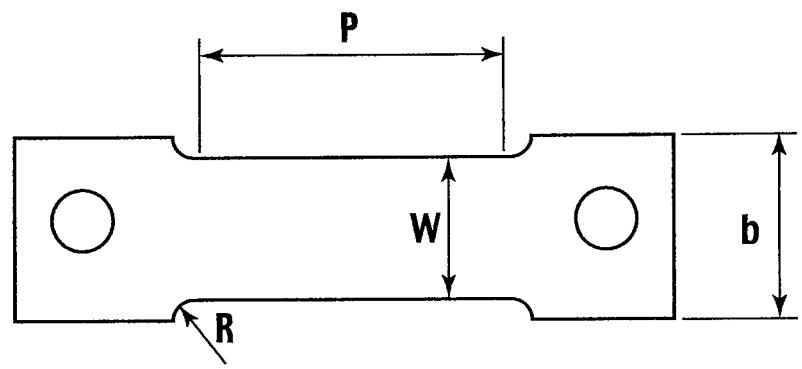

FIG. 10 is a block diagram for explaining another temperature compensating circuit of the magnetostrictive axial force sensor 16.

As shown in FIG. 10, the output signals A1, A2 from the respective linear Hall ICs 104A, 104B are inputted to an adding circuit 119, and the signals from the adding circuit 119 added by the output signals A1, A2 of the linear Hall ICs 104A, 104B are inputted to a voltage controller 118. The voltage controller 118 controls the supply voltage Vcc such that the signals (signals denoting addition of outputs of linear Hall ICs 104A, 104B) from the adding circuit 119 can be continuously kept constant.

Herein, when the zero points of the output signals A1, A2 of the respective linear Hall ICs 104A, 104B are deviated from 0 V, controlling the supply voltage Vcc such that addition of the voltages corresponding to the sensitivities of the linear Hall ICs 104A, 104B continuously equals to that at a room temperature can implement sensitivity compensation with higher accuracy. When the zero point of the linear Hall ICs 104A, 104B is larger than 0.1 V (absolute value), this method is especially preferable.

As set forth above, the magnetostrictive axial force sensor 16 is inexpensive and uses the permanent magnet 113, first and second magnetic sensors 104A, 104B which three are higher in robustness than a strain gauge, thereby the magnetostrictive axial force sensor 16 per se can be prepared with high robustness and at an inexpensive price.

Moreover, the magnetizing direction (refer to arrow 113A) of the permanent magnet 113 coincides with the direction (upper and lower in FIG. 7) orthogonal to the face contacting the permanent magnet 113 for the second and third magnetic members 108, 109, thus accomplishing the magnetostrictive axial force sensor 16 which has good sensing characteristic (sensitivity).

As set forth above, the present invention allows the magnetostrictive stress sensor to accomplish electric power saving and miniaturizing In addition, the magnetostrictive stress sensor of the present invention has a robustness and is excellent in temperature characteristics and is thereby improved dramatically in its utility.

The present invention is not limited to the embodiments 1 to 6 set forth above and therefore may be varied within the claimed range.

For example, the first magnetic sensor 40, second magnetic sensor 45, first magnetic sensor 104A and second magnetic sensor 104B are not each limited to the linear Hall IC. From the viewpoint of electric power saving and miniaturizing. Hall element, GMR (Giant Magneto Resistance Effect) sensor may be applied to the first magnetic sensor 40, second magnetic sensor 45, first magnetic sensor 104A and second magnetic sensor 104B.

The magnetic member 20 of the embodiments 1 to 5 are not limited to the maraging steel. For example, FeAl alloy (for example, alfer), FeCoV alloy (for example, permendur) and FeGa alloy and FeGaAl alloy (for example, galfenol) each of which has a good magnetostrictive effect may be applied to the magnetic member 20.

With the magnetostrictive axial force sensor 16 according to the sixth embodiment, the entirety of the shaft member 102 is not necessarily a magnetic material and otherwise at least a portion for mounting the linear Hall ICs 104A, 104B of the return part 103 and an area close to such portion be a magnetic material having magnetostriction. Moreover, the shape of the shaft member 102 is not limited to column. The magnetostrictive axial force sensor 16 is applicable to any other member as long as the axial force acts on such member. Positions for mounting the permanent magnet 113, first magnetic sensor 104A, second magnetic sensor 104B in the return part 103 are not limited to the second and third magnetic members 108, 109 and therefore may be the first and second magnetic members 107, 108, the fourth and fifth magnetic members 110, 111, or the fifth and sixth magnetic members 111, 112. The mounting positions may be a combination of these. Moreover, the number of returns (the number of magnetic members) at the return part 103 may be different from that according to the sixth embodiment set forth above.

Hereinafter, more specific descriptions are to be made based on examples 1 to 5. The present invention is, however, not limited to the examples 1 to 5.

Example 1

Figure 19:
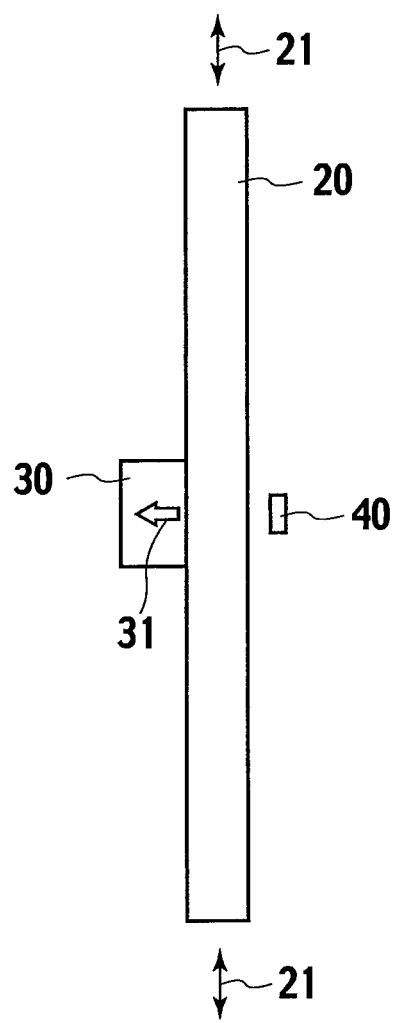
FIG. 19 explains an example 1 of the present invention.

As shown in FIG. 19, a plate member made from maraging steel and having a width of 20 mm and a thickness of 2 mm was prepared as the magnetic member 20 having magnetostriction. The plate member was prepared by using a maraging steel (made by Hitachi Metals, Ltd., trade name YAG300, 18% Ni-9% Co-5% Mo—Fe). After being prepared through a machining, the plate member was subjected to a solid solution treatment and an aging heat treatment. During the solid solution treatment, the plate member was kept in a vacuum at 820° C. for 1 hr., followed by cooling to a room temperature. Then, during the aging heat treatment, the plate member was kept in a vacuum at 490° C. for 5 hrs., followed by air cooling.

As the permanent magnet 30, a columnar magnet was used in such a manner as to be magnetized axially. An SmCo magnet having a diameter of $\phi10$ mm and a length of 7 mm was used. An end face of the permanent magnet 30 after the magnetizing showed a magnetic flux density of about 4 kG.

A thin probe of a gauss meter was used as the first magnetic sensor 40. The first magnetic sensor 40 was used for detecting magnetic flux component in a direction perpendicular to the plate face. The first magnetic sensor 40 was used for detecting magnetic flux at about 0.5 mm above the surface of the plate member.

Figure 20:
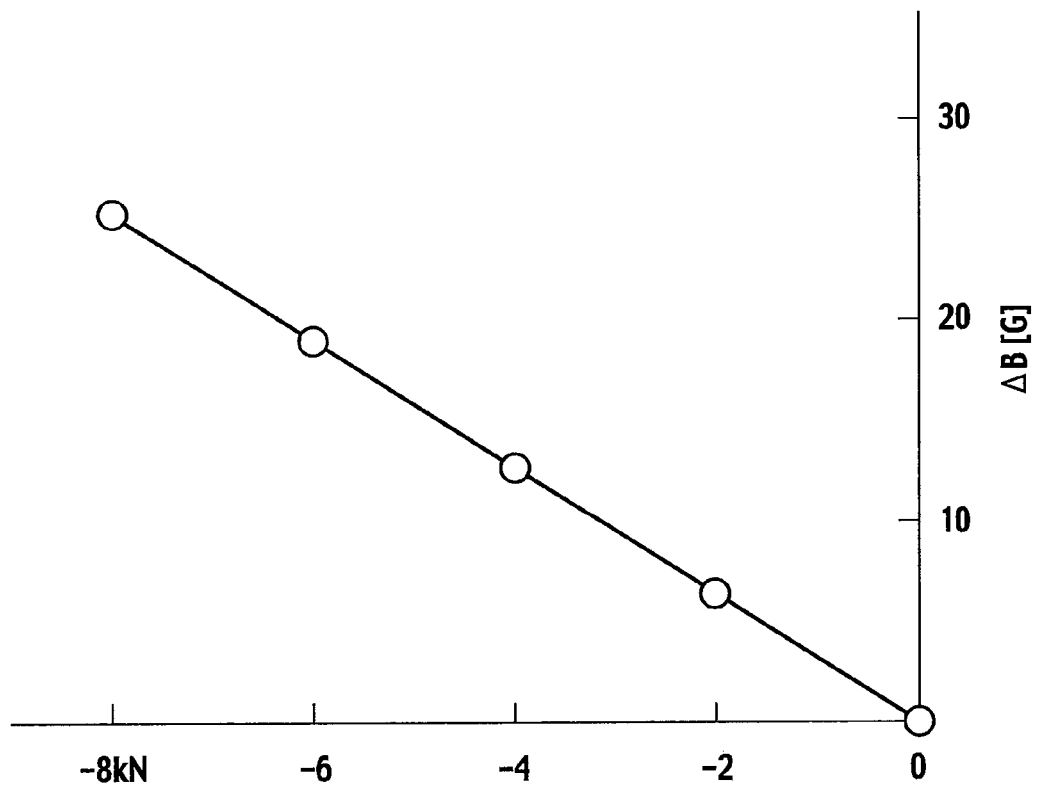
FIG. 20 shows changes of magnetic flux densities with a compressive load applied to a plate member, according to the example 1 of the present invention.

FIG. 20 shows changes of magnetic flux densities with a compressive load applied to the plate member. The ordinate denotes changes $\Delta B[G]$ of magnetic flux density while the abscissa denotes compressive load [kN] applied to the plate member. Herein, the magnetic flux density at load 0 was about 150 G. As shown in FIG. 20, a good characteristic was obtained which is linear and has no hysteresis. The compressive load of 8 kN (200 MPa) corresponds to change (increase) of 25 G.

A tensile load applied to the plate member showed substantially the same characteristic. However, a tensile load of 8 kM (200 MPa) corresponds to change (decrease) of 20 therefore the sensitivity was lower when the tensile load was applied.

In positions where the first magnetic sensor 40 was moved forward, backward, leftward and rightward by 1 mm, the first magnetic sensor 40 shows the same characteristic.

Figure 21:
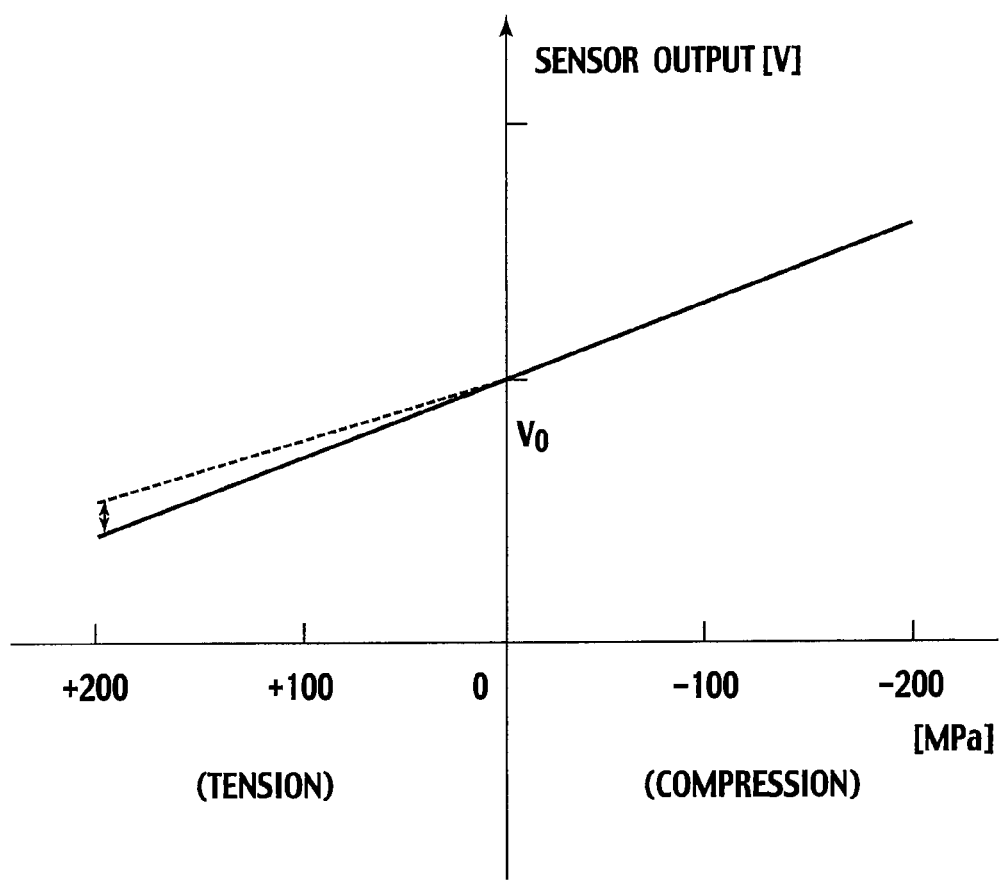
FIG. 21 is a graph showing output characteristic data of the magnetostrictive stress sensor, which data was obtained, according to the example 1 of the present invention.

The magnetostrictive stress sensor which has different sensitivities between the tensile state and the compressive state when used as a tensile-and-compressive magnetostrictive stress sensor seems inconvenient. In this case, however, corrections associated with circuit is with ease. For example, zero point of the magnetostrictive stress sensor is set to 2.5 V. Then, determining a voltage signal higher than the zero point as the compressive state and determining a voltage signal lower than the zero point as the tensile state, followed by sensitivity correction allow the sensor to have the same sensitivity both in the tensile state and the compressive state. FIG. 21 shows an example of sensor output. Vo denotes zero point of the sensor, a dotted line shows a situation that the sensitivity correction was not implemented in the tensile state, and an actual line denotes that the sensitivity correction was implemented. It has been proved that implementing the sensitivity correction allows the magnetostrictive stress sensor to function as a sensor featuring the same sensitivity both in the tensile state and the compressive state.

Example 2

The magnetostrictive stress sensor 14 having the structure shown in FIG. 5, i.e., according to the fourth embodiment was prepared.

The magnetic member 20 having magnetostrictive was prepared by using a maraging steel (made by Hitachi Metals, Ltd., trade name YAG300, 18% Ni-9% Co-5% Mo—Fe). The plate-shaped strain-causing part 22 of the magnetic member 20 had a minimum thickness of 0.5 mm and a width of 10 mm. The flange part 24 disposed on either end in the widthwise direction had a width of 1.5 mm and a thickness of 1.5 mm. The magnetic member 20 was prepared through a machining, followed by solute and aging heat treatments. The solute treatment was implemented in a vacuum at 820° C. for 1 hr., followed by cooling to a room temperature. Then, the aging heat treatment was implemented in a vacuum at 490° C. for 5 hrs., followed by air cooling.

As the permanent magnet 30, a columnar magnet was used in such a manner as to be magnetized axially. An SmCo magnet having a diameter $\phi=3$ mm and a length L=3.5 mm was used. The permanent magnet 30 was magnetized by means of a pulse magnetic field of 10 T, followed by heat extinction at 200° C. for 1 hr. An end face of the permanent magnet 30 after the magnetizing showed a magnetic flux density of about 4.1 kG.

A linear Hall IC was used as the first magnetic sensor 40. The magnetic sensitivity was about 7 mV/G.

The first yoke 60 for the permanent magnet 30 was also prepared by using a maraging steel. The first yoke 60 had a thickness of 0.5 mm.

The second yoke 70 and third yoke 75 for the respective first and second magnetic sensors 40, 45 were prepared by using PB permalloy. After machining, heat treatment was implemented at 1200° C. for 2 hr. in pure hydrogen.

By means of an electronic beam welding, the leg part 23 of the magnetic member 20 was joined to a plate-like member {counterpart of stress-applied member 50 in FIG. 2(C)} made of steel.

Then, a load was applied to the plate-like member for testing, thereby obtaining a good sensor characteristic having no hysteresis. Stress conversion was implemented at the strain-causing part 22, obtaining a signal (25 G at 200 MPa) which was on the same level as that in FIG. 20. In addition, temperature characteristic was good between −30° C. to 100° C.

Example 3

The magnetostrictive stress sensor 15 having the structure shown in FIG. 6, i.e., according to the fifth embodiment was prepared. The example 2 was repeated except that the permanent magnet 35 was different in shape from the permanent magnet 30.

An SmCo magnet having a diameter $\phi=6$ mm and a width of 1.6 mm was used as the permanent magnet 35. An end face of the permanent magnet 35 after the magnetizing showed a magnetic flux density of about 2.1 kG. The permanent magnet 35 was held via the spacer 36 made from a non-magnetic material. Then, the permanent magnet 35 was disposed spaced away from the magnetic member 20 and first yoke 60.

The magnetic filed in the position of the first magnetic sensor 40 was about 200 G. The sensor sensitivity according to the example 3 was improved by about 50% compared to the example 2. It was found that a sufficient sensor characteristic was secured without the need for disposing the permanent magnet 35 in contact with the magnetic member 20 and first yoke 60.

Example 4

The magnetostrictive axial force sensor 16 having the structure shown in FIG. 7 and FIG. 8, i.e., according to the sixth embodiment was prepared.

The shaft member 102 and first to sixth magnetic members 107 to 112 were prepared by using a maraging steel (made by Hitachi Metals, Ltd., trade name YAG300, 18% Ni-9% Co-5% Mo—Fe). The first to sixth magnetic members 107 to 112 each had a plate thickness d of 1.0 mm and a width h of 10 mm. The first to sixth magnetic members 107 to 112 were prepared through a machining, followed by solute and aging heat treatments. The solute treatment was implemented in a vacuum at 820° C. for 1 hr., followed by cooling to a room temperature. Then, the aging heat treatment was implemented in a vacuum at 490° C. for 5 hrs., followed by air cooling.

As the permanent magnet 113, a columnar magnet was used in such a manner as to be magnetized axially. An SmCo magnet having a diameter $\phi=3$ mm and a length L=3.5 mm was used. The permanent magnet 113 was magnetized by means of a pulse magnetic field of 10 T, followed by heat extinction at 200° C. for 1 hr. An end face of the permanent magnet 113 after the magnetizing showed a magnetic flux density of about 4.1 kG.

A linear Hall IC was used as each of the first and second magnetic sensors 104A and 104B. The magnetic sensitivity was about 7 mV/G.

Figure 22:
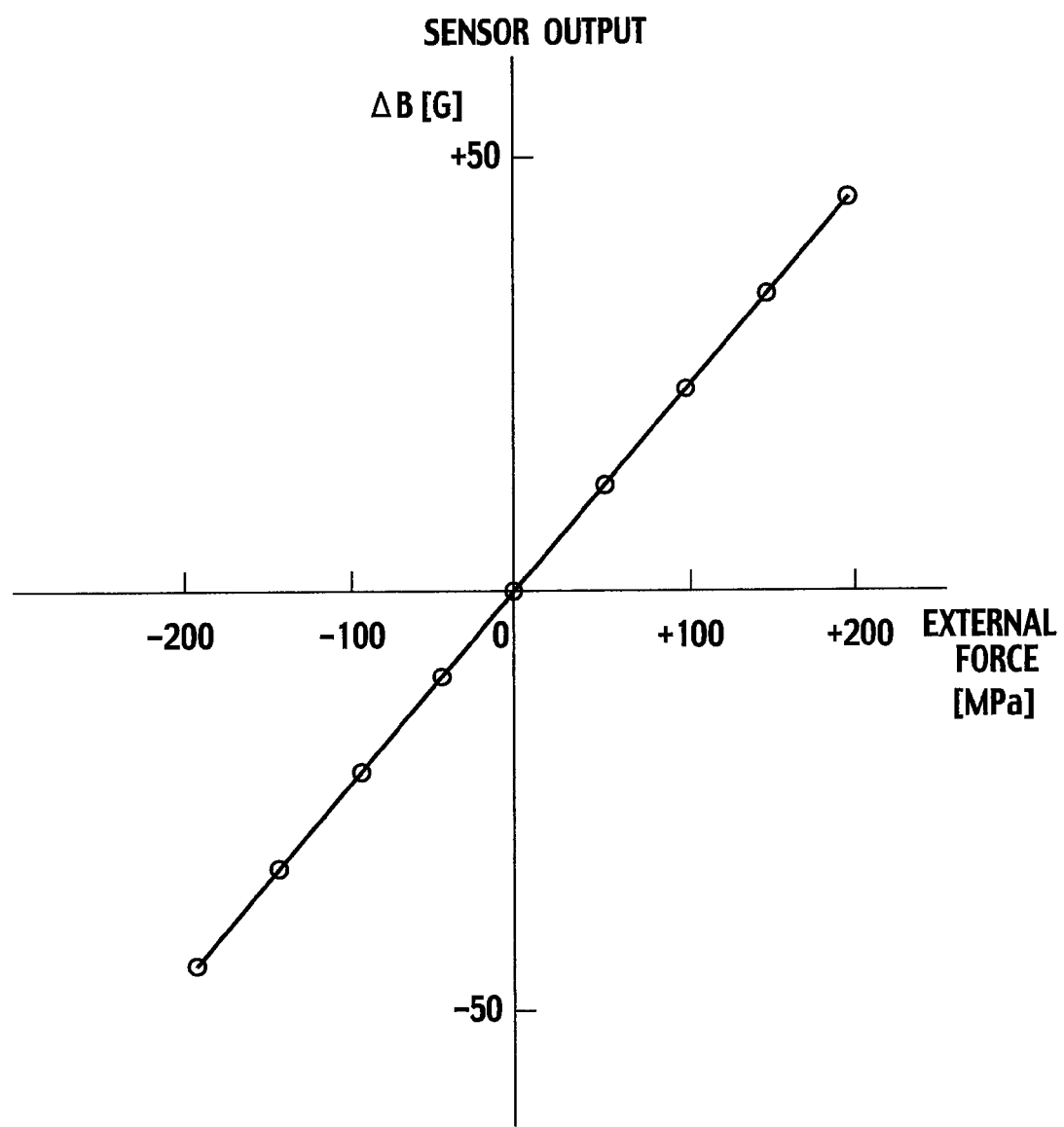
FIG. 22 is a graph showing measurement results of sensitivity of the magnetostrictive axial force sensor, according to an example 4.

FIG. 22 is a graph showing measurement results of sensitivity of the magnetostrictive axial force sensor 16 according to the example 4. The stress on the abscissa is converted into a stress of magnetic material. As shown in FIG. 22, 45 G of sensor output (magnetic flux change differentiated) was obtained per stress of 200 MPa. As such, it was confirmed that the stress value can be converted from the sensor output.

Example 5

The magnetostrictive axial force sensor 16 having the structure shown in FIG. 7 and FIG. 8, i.e., according to the sixth embodiment was prepared.

The temperature sensor 106 was disposed adjacent to the magnetostrictive axial force sensor 16 according to the example 4. Based on the signal from the temperature sensor 106, the supply voltage Vcc to the linear Hall ICs 104A, 104B was controlled for temperature compensation (refer to FIG. 9). Specifically, at first, the supply voltage Vcc was set to 5.00 V at room temperature, followed by increasing temperature of entirety of the magnetostrictive axial force sensor 16 to 100° C. As such a calibration value was so set as to output the supply voltage Vcc which brings about the same sensor sensitivity in two conditions. Then, the temperature between the two temperature points (room temperature and 100° C.) was linearly interpolated, while the calibration value was set by a linear extrapolation outside the above area (less than room temperature and more than 100° C.).

Then, the temperature was changed while the supply voltage Vcc was controlled based on temperature signals, to thereby measure the sensitivity.

Figure 23:
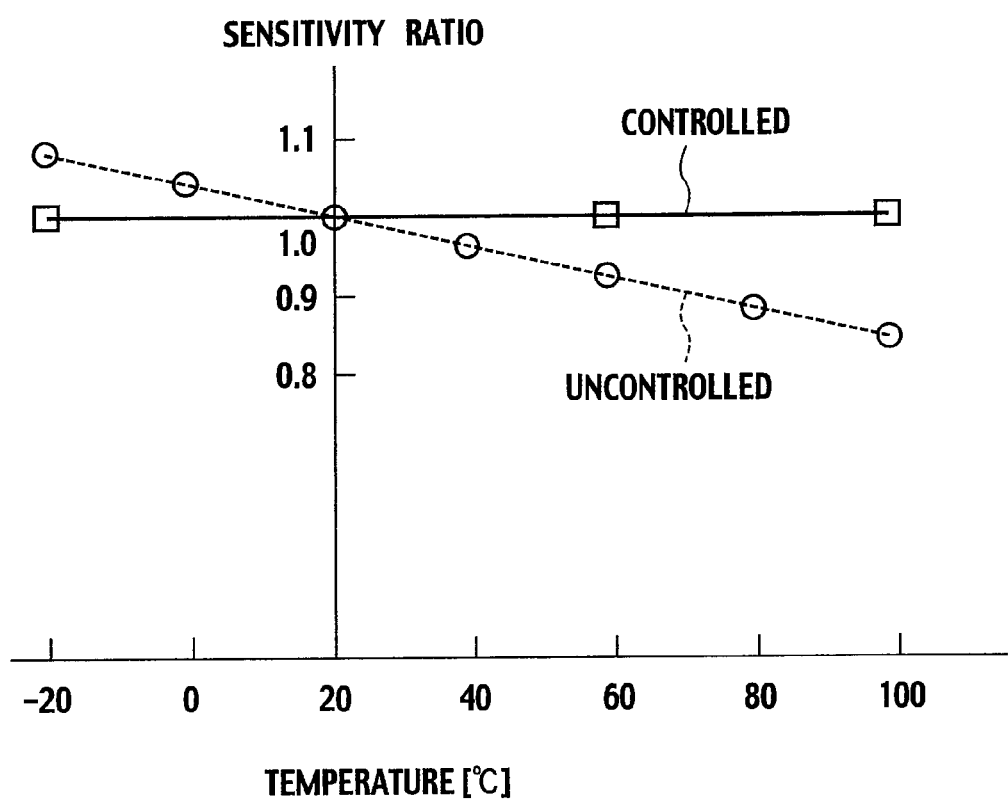
FIG. 23 is a graph showing measurement results of temperature characteristics of the magnetostrictive axial force sensor, according to an example 5.

FIG. 23 is a graph showing measurement results of temperature characteristics of the magnetostrictive axial force sensor 16 according to the example 5. The sensitivity ratio on the ordinate denotes a sensitivity by normalizing the sensor output based on the value at 20° C. The broken line denotes no control of supply voltage while the actual line denotes control of the supply voltage. As shown in FIG. 23, the broken line denotes the sensitivity ratio changeable with temperature change while the actual line denotes substantially a constant sensitivity despite the temperature change. As such, it was confirmed that temperature compensation of the sensitivity was preferably implemented in a range of −20° C. to 100° C.

The entire contents of Japanese Patent Application No. 2007-085520 (filed on Mar. 28, 2007), Japanese Patent Application No. 2007-085524 (filed on Mar. 28, 2007) and Japanese Patent Application No. 2007-301346 (filed on Nov. 21, 2007) are incorporated herein by reference.

INDUSTRIAL APPLICABILITY

With the magnetostrictive stress sensor of the present invention, the direction of the stress acting on the magnetic member and the magnetizing direction of the permanent magnet 30 are substantially orthogonal, detecting the leak magnetic flux's change which depends on the stress, where the leak magnetic flux is on the side opposite to the permanent magnet with respect to the magnetic member. The level of the leak magnetic flux is lower than the level of the magnetic flux caused by the permanent magnet 30. In this state, the first magnetic sensor detects the change which depends on the stress, thus making it possible to accurately and precisely detect the stress acting on the magnetic member.

The invention claimed is:

1. A magnetostrictive stress sensor comprising:
a magnetic member having a magnetostriction;
a permanent magnet adjacent to the magnetic member;
a magnetic sensor for detecting a leak magnetic flux on a side opposite to the permanent magnet with respect to the magnetic member,
wherein
the leak magnetic flux changes according to a stress acting on the magnetic member and the magnetic sensor detects the change of the leak magnetic flux, to thereby detect the stress acting on the magnetic member, and
a direction of the stress acting on the magnetic member is substantially orthogonal to a magnetizing direction of the permanent magnet.

2. The magnetostrictive stress sensor according to claim 1 wherein the magnetic member is plate-like.

3. The magnetostrictive stress sensor according to claim 2 wherein, in a cross section orthogonal to the direction of the stress, end parts of the magnetic member are each thicker than a center part of the magnetic member.

4. The magnetostrictive stress sensor according to claim 1 wherein the magnetic member is made from a maraging steel.

5. The magnetostrictive stress sensor according to claim 1 wherein the magnetic member is made from an 18% Ni-base maraging steel.

6. The magnetostrictive stress sensor according to claim 1 wherein the magnetic member is made from an 18% Ni-base maraging steel and is subjected to an aging heat treatment.

7. The magnetostrictive stress sensor according to claim 1 wherein
the permanent magnet has a first end face and a second end face which are each orthogonal to the magnetizing direction of the permanent magnet, and
a first yoke made from a material same as a material of the magnetic member is disposed on the magnetostrictive stress sensor, in such a manner as to face the second end face opposite to the first end face facing the magnetic member.

8. The magnetostrictive stress sensor according to claim 7 wherein the magnetic member's thickness of a part facing the first end face of the permanent magnet is substantially the same as the first yoke's thickness of a part facing the second end face of the permanent magnet.

9. The magnetostrictive stress sensor according to claim 7, further comprising:
another magnetic sensor other than the magnetic sensor, the another magnetic sensor being for monitoring a magnetic flux of the permanent magnet in a state not depending on the stress acting on the magnetic member,
wherein a sensor output is defined as a differential output between an output of the first magnetic sensor and an output of the another magnetic sensor.

10. The magnetostrictive stress sensor according to claim 9 wherein the another magnetic sensor is a Hall element or a linear Hall IC.

11. The magnetostrictive stress sensor according to claim 9 wherein
the another magnetic sensor has a first face and a second face, and a third yoke faces the second face opposite to the first face facing the first yoke, and
the third yoke made from a soft magnetic material is so disposed as to cover the another magnetic sensor.

12. The magnetostrictive stress sensor according to claim 7 wherein the magnetostrictive stress sensor holds the permanent magnet via a spacer made from a non-magnetic material, to thereby allow the permanent magnet to be disposed away from the magnetic member and the first yoke.

13. The magnetostrictive stress sensor according to claim 1 wherein
the magnetic sensor has a first face and a second face, and a second yoke made from a soft magnetic material and used for the magnetic sensor is disposed in such a manner as to face the second face opposite to the first face facing the magnetic member.

14. The magnetostrictive stress sensor according to claim 1 wherein
the magnetostrictive stress sensor includes a first member and a second member which are adjacent to each other in such a manner as to form a pairwise formation in a direction orthogonal to an axial direction of a shaft member on which an axial force acts,
the acting axial force causes a tensile force to one of the first and second members and a compressive force to the other of the first and second members,
the permanent magnet is disposed between the first member and the second member, and the magnetostrictive stress sensor includes:
a first magnetic sensor disposed opposite to the permanent magnet with respect to the first member, and
a second magnetic sensor disposed opposite to the permanent magnet with respect to the second member.

15. The magnetostrictive stress sensor according to claim 14 wherein differentiating output signals of the respective first and second magnetic sensors brings about a sensor signal.

16. The magnetostrictive stress sensor according to claim 14 wherein the first and second members are each formed into a plate.

17. The magnetostrictive stress sensor according to claim 1 wherein the magnetic sensor is a Hall element or a linear Hall IC.

* * * * *